US012183056B2

(12) United States Patent
Andriushchenko et al.

(10) Patent No.: US 12,183,056 B2
(45) Date of Patent: Dec. 31, 2024

(54) ADVERSARIALLY ROBUST VISUAL FINGERPRINTING AND IMAGE PROVENANCE MODELS

(71) Applicant: Adobe Inc., San Jose, CA (US)

(72) Inventors: Maksym Andriushchenko, Lausanne (CH); John Collomosse, Woking (GB); Xiaoyang Li, San Francisco, CA (US); Geoffrey Oxholm, Albany (CA)

(73) Assignee: Adobe Inc., San Jose, CA (US)

( * ) Notice: Subject to any disclaimer, the term of this patent is extended or adjusted under 35 U.S.C. 154(b) by 565 days.

(21) Appl. No.: 17/573,041

(22) Filed: Jan. 11, 2022

(65) Prior Publication Data
US 2023/0222762 A1 Jul. 13, 2023

(51) Int. Cl.
*G06V 10/75* (2022.01)
*G06F 16/58* (2019.01)
(Continued)

(52) U.S. Cl.
CPC .......... *G06V 10/751* (2022.01); *G06F 16/583* (2019.01); *G06F 16/5866* (2019.01);
(Continued)

(58) Field of Classification Search
CPC .... G06V 10/751; G06V 10/72; G06V 10/771; G06V 10/454; G06V 10/74;
(Continued)

(56) References Cited

U.S. PATENT DOCUMENTS

| 11,601,442 B2 | 3/2023 | Sekar et al. |
| 2022/0215205 A1* | 7/2022 | Swaminathan ....... G06F 18/214 |
| 2023/0306721 A1* | 9/2023 | Karlinsky .............. G06V 10/82 |

FOREIGN PATENT DOCUMENTS

| CA | 3034323 A1 | 3/2018 |
| CN | 112966127 B | 5/2022 |
| WO | 2022005653 A1 | 1/2022 |

OTHER PUBLICATIONS

Andrew Rouditchenko et al., "Self-Supervised Audio-Visual Co-segmentation"; 978-1-5386-4658-8/18, © 2019 IEEE (Year: 2019).
(Continued)

*Primary Examiner* — Kent Yip
(74) *Attorney, Agent, or Firm* — Keller Preece PLLC

(57) ABSTRACT

The present disclosure relates to systems, methods, and non-transitory computer readable media that utilize a deep visual fingerprinting model with parameters learned from robust contrastive learning to identify matching digital images and image provenance information. For example, the disclosed systems utilize an efficient learning procedure that leverages training on bounded adversarial examples to more accurately identify digital images (including adversarial images) with a small computational overhead. To illustrate, the disclosed systems utilize a first objective function that iteratively identifies augmentations to increase contrastive loss. Moreover, the disclosed systems utilize a second objective function that iteratively learns parameters of a deep visual fingerprinting model to reduce the contrastive loss. With these learned parameters, the disclosed systems utilize the deep visual fingerprinting model to generate visual fingerprints for digital images, retrieve and match digital images, and provide digital image provenance information.

20 Claims, 14 Drawing Sheets

(51) Int. Cl.
  *G06F 16/583* (2019.01)
  *G06N 3/084* (2023.01)
  *G06V 10/72* (2022.01)
  *G06V 10/771* (2022.01)
(52) U.S. Cl.
  CPC ............. *G06N 3/084* (2013.01); *G06V 10/72* (2022.01); *G06V 10/771* (2022.01)
(58) Field of Classification Search
  CPC .... G06V 10/774; G06V 10/82; G06F 16/583; G06F 16/5866; G06N 3/084; G06N 3/094; G06N 3/0442; G06N 3/0464; G06N 3/0475; G06N 3/045
  See application file for complete search history.

(56) References Cited

OTHER PUBLICATIONS

Sepehr Valipour et al., "Recurrent Fully Convolutional Networks for Video Segmentation": arXiv: 1606.00487v3 [cs.CV] Oct. 31, 2016 (Year: 2016).
U.S. Appl. No. 17/822,573, Apr. 19, 2024, Notice of Allowance.
A. Bharati, D. Moreira, P.J. Flynn, A. de Rezende Rocha, K.W. Bowyer, and W.J. Scheirer. 2021. Transformation-Aware Embeddings for Image Provenance. IEEE Trans. Info. Forensics and Sec. 16 (2021), 2493-2507.
A. Gordo, J. Almazan, J. Revaud, and D. Larlus. Deep image retrieval: Learning global representations for image search. In Proc. ECCV, pp. 241-257, 2016.
Andreas Geiger, Philip Lenz, Christoph Stiller, and Raquel Urtasun. Vision meets robotics: The kitti dataset. International Journal of Robotics Research (IJRR), 2013.
B. Dolhansky, J. Bitton, B. Pflaum, J. Lu, R. Howes, M. Wang, and C. C. Ferrer. The deepfake detection challenge (DFDC) dataset. CoRR, abs/2006.07397, 2020.
C. Jacobs, A. Finkelstein, and D. Salesin. 1995. Fast multiresolution image querying. In Proc. ACM SIGGRAPH. ACM, 277-286.
C. Zauner. Implementation and benchmarking of perceptual image hash functions. Master's thesis, Upper Austria University of Applied Sciences, Hagenberg, 2010.
Coalition for Content Provenance and Authenticity. 2021. Draft Technical Specification 0.7. Technical Report. C2PA. https://c2pa.org/public-draft/.
D. Brian, H. Russ, P. Ben, B. Nicole, and F. C. Canton. 2019. The deepfake detection challenge (dfdc) preview dataset. arXiv preprint arXiv:1910.08854 (2019).
D. Moreira, A. Bharati, J. Brogan, A. Pinto, M. Parowski, K.W. Bowyer, P.J. Flynn, A. Rocha, and W.J. Scheirer. 2018. Image provenance analysis at scale. IEEE Trans. Image Proc. 27, 12 (2018), 6109-6122.
D. Profrock, M. Schlauweg, and E. Muller. Content-based watermarking by geometric wrapping and feature-based image segmentation. In Proc. SITIS, pp. 572-581, 2006.
Dan Hendrycks, Steven Basart, Norman Mu, Saurav Kadavath, Frank Wang, Evan Dorundo, Rahul Desai, Tyler Zhu, Samyak Parajuli, Mike Guo, et al. The many faces of robustness: A critical analysis of out-of-distribution generalization. arXiv preprint arXiv:2006.16241, 2020.
E. J. Humphrey and J. P. Bello. 2012. Rethinking automatic chord recognition with convolutional neural networks. In Proc. Intl. Conf. on Machine Learning and Applications.
F. Khelifi and A. Bouridane. Perceptual video hashing for content identification and authentication. IEEE TCSVT, 1(29), 2019.
F. Rigaud and M. Radenen. 2016. Singing voice melody transcription using deep neural networks. In Proc. Intl. Conf. on Music Information Retrieval (ISMIR).
F. Zheng, G. Zhang, and Z. Song. 2001. Deep convolutional neural networks for predominant instrument recognition in polyphonic music. J. Computer Science and Technology 16, 6 (2001), 582-589.
G. Tzanetakis and P. Cook. 2002. Musical genre classification of audio signals. IEEE Trans. on Audio and Speech Proc. (2002).
Github.com—ISCC—Specification v1.0.0—Date downloaded Aug. 19, 2022; https://github.com/iscc/iscc-specs/blob/version-1.0/docs/specification.md.
H. Chen, W. Xie, A. Vedaldi, and A. Zisserman. 2020b. VGG-Sound: A large scale audio-visual dataset. In Proc. Intl. Conf. on Acoustics, Speech and Signal Processing (ICASSP).
H. Lee, P. Pham, Y. Largman, and A. Y. Ng. 2009. Unsupervised feature learning for audio classification using convolutional deep belief networks. In Proc. Advances in Neural Information Processing Systems (NIPS).
H. Liu, R. Wang, S. Shan, and X. Chen. Deep supervised hashing for fast image retrieval. In Proc. CVPR, pp. 2064-2072, 2017.
H. Shawn, C. Sourish, E. Daniel PW, G. Jort F, J. Aren, M. R. Channing, P. Manoj, P. Devin, S. Rif A, S. Bryan, et al. 2017. CNN architectures for large-scale audio classification. In Proc. Intl. Conf. on Acoustics, Speech and Signal Processing (Icassp). IEEE, 131-135.
H. Zhu, M. Long, J. Wang, and Y. Cao. Deep hashing network for efficient similarity retrieval. In Proc. AAAI, 2016.
IPTC Council. Social media sites photo metadata test results. http://embeddedmetadata.org/social-media-test-results.php, 2020.
J. Aythora et al. Multi-stakeholder media provenance management to counter synthetic media risks in news publishing. In Proc. Intl. Broadcasting Convention (IBC), 2020.
J. Buchner. Imagehash. https://pypi.org/ project/ImageHash/, 2021.
J. Collomosse, T. Bui, A. Brown, J. Sheridan, A. Green, M. Bell, J. Fawcett, J. Higgins, and O. Thereaux. Archangel: Trusted archives of digital public documents. In Proc. ACM Doc.Eng, 2018.
J. Deng, W. Dong, R. Socher, L.-J. Li, K. Li, and L. Fei-Fei. ImageNet: A Large-Scale Hierarchical Image Database. In Proc. CVPR, 2009.
J. Johnson, M. Douze, and H. Jegou. Billion-scale similarity search with gpus. IEEE Transactions on Big Data, 2017.
J. Lee, J. Park, K. L. Kim, and J. Nam. 2017. Sample-level deep convolutional neural networks for music auto-tagging using raw waveforms. arXiv preprint arXiv:1703.01789 (2017).
J. S. Downie. 2003. Music Information Retrieval. Annual review of information science and technology 37, 1 (2003), 295-340.
J. Schluter and S. Bock. 2013. Musical onset detection with convolutional neural networks. In Proc. Intl. Workshop on Machine Learning and Music (MML).
J. Wang, H. T. Shen, J. Song, and J.Ji. Hashing for similarity search: A survey. arXiv preprint arXiv:1408.2927, 2014.
K. Choi, G. Fazekas, K. Cho, and M. Sandler. 2018. A Tutorial on Deep Learning for Music Information Retrieval. arXiv:1709.04396v2 (2018).
K. Choi, G. Fazekas, M. Sandler, and K. Cho. 2017. Convolutional recurrent neural networks for music classification. In Proc. Intl. Conf. on Acoustics, Speech and Signal Processing (ICASSP).
K. Hameed, A. Mumtax, and S. Gilani. 2006. Digital image watermarking in the wavelet transform domain. WASET 13 (2006), 86-89.
Karen Sparck Jones. 1972. A statistical interpretation of term specificity and its application in retrieval. Journal of documentation (1972).
L. Yuan, T. Wang, X. Zhang, F. Tay, Z. Jie, W. Liu, and J. Feng. Central similarity quantization for efficient image and video retrieval. In Proc. CVPR, pp. 3083-3092, 2020.
L.-C. Yang, S.-Y. Chou, J.-Y. Liu, Y.-H. Yang, and Y.-A. Chen. 2017. Revisiting the problem of audio-based hit song prediction using convolutional neural networks. arXiv preprint arXiv:1704.01280 (2017).
M. Douze, G. Tolias, E. Pizzi, Z. Papakipos, L. Chanussot, F. Radenovic, T. Jenicek, M. Maximov, L. Leal-Taixé, I. Elezi, O. Chum, and C. C. Ferrer. 2021. The 2021 Image Similarity Dataset and Challenge. CoRR abs/2106.09672 (2021). arXiv:2106.09672 http://arxiv.org/abs/2106.09672.
M. Huh, A. Liu, A. Owens, and A. Efros. Fighting fake news: Image splice detection via learned self-consistency. In Proc. ECCV, 2018.

(56) References Cited

OTHER PUBLICATIONS

N. Yu, L. Davis, and M. Fritz. Attributing fake images to gans: Learning and analyzing gan fingerprints. In IEEE International Conference on Computer Vision (ICCV), 2019.
N. Yu, V. Skripniuk, S.r Abdelnabi, and M. Fritz. 2021. Artificial Fingerprinting for Generative Models: Rooting Deepfake Attribution in Training Data. In Proc. Intl. Conf. Computer Vision (ICCV).
P. Devi, M. Venkatesan, and K. Duraiswamy. A fragile watermarking scheme for image authentication with tamper localization using integer wavelet transform. J. Computer Science, 5(11):831-837, 2009.
P. Torr and A. Zisserman. Mlesac: A new robust estimator with application to estimating image geometry. Computer Vision Image Understanding (CVIU), 78(1):138-156, 2000.
Q-Y. Jiang and W-J. Li. 2018. Asymmetric Deep Supervised Hashing. In AAAI.
Q. Li, Z. Sun, R. He, and T. Tan. Deep supervised discrete hashing. In Proc. NeurIPS, pp. 2482-2491, 2017.
R. Hadsell, S. Chopra,and Y. LeCun. Dimensionality reduction by learning an invariant mapping. In Proc. CVPR, pp. 1735-1742, 2006.
R. Lu, K. Wu, Z. Duan, and C. Zhang. 2017. Deep ranking: triplet matchnet for music metric learning. In Proc. Intl. Conf. on Acoustics, Speech and Signal Processing (ICASSP).
S-Y. Wang, O. Wang, A. Owens, R. Zhang, and A. Efros. Detecting photoshopped faces by scripting photoshop. In Proc. ICCV, 2019.
S-Y. Wang, O. Wang, R. Zhang, A. Owens, and A. Efros. Cnn-generated images are surprisingly easy to spot . . . for now. In Proc. CVPR, 2020.
S. Baba, L. Krekor, T. Arif, and Z. Shaaban. Watermarking scheme for copyright protection of digital images. IJCSNS, 9(4), 2009.
S. Dieleman and B. Schrauwen. 2014. End-to-end learning for music audio. In Proc. Intl. Conf. on Acoustics, Speech and Signal Processing (ICASSP).
S. Gregory. 2019. Ticks or it didn't happen. Technical Report. Witness.org.
S. Jenni and P. Favaro. Self-supervised feature learning by learning to spot artifacts. In Proc. CVPR, 2018.
S. Sigtia, E. Benetos, and S. Dixon. 2015. An end-to-end neural network for polyphonic music transcription. arXiv preprint arXiv:1508.01774 (2015).
S. Su, C. Zhang, K. Han, and Y. Tian. 2018. Greedy hash: Towards fast optimization for accurate hash coding in CNN. In Proc. NeurIPS. 798-807.
T. Bertin-Mahieux, D. P. Ellis, B. Whitman, and P. Lamere. 2011. The million song dataset. In Proc. Intl. Conf of Soceity for Music Information Retrieval. 591-596.
T. Bui, D. Cooper, J. Collomosse, M. Bell, A. Green, J. Sheridan, J. Higgins, A. Das, J. Keller, and O. Thereaux. 2020. Tamper-proofing Video with Hierarchical Attention Autoencoder Hashing on Blockchain. IEEE Trans. Multimedia (TMM) 22, 11 (2020), 2858-2872. https://doi.org/10.1109/TMM.2020.2967640.
T. Grill and J. Schluter. 2015. Music boundary detection using neural networks on spectrograms and self-similarity lag matrices. In Proc. EUSPICO.
T. Pan. 2019. Digital-Content-Based Identification: Similarity hashing for content identification in decentralized environments. In Proc. Blockchain for Science.
Vladimir I Levenshtein et al. 1966. Binary codes capable of correcting deletions, insertions, and reversals. In Soviet physics doklady, vol. 10. Soviet Union, 707-710.
W. Li, S. Wang, and W-C. Kang. 2016. Feature learning based deep supervised hashing with pairwise labels. In Proc. IJCAI. 1711-1717.
W. Wang, J. Dong, and T. Tan. Tampered region localization of digital color images based on jpeg compression noise. In International Workshop on Digital Watermarking, pp. 120-133. Springer, 2010.
X. Zhang, Z. H. Sun, S. Karaman, and S.F. Chang. 2020. Discovering Image Manipulation History by Pairwise Relation and Forensics Tools. IEEE J. Selected Topics in Signal Processing. 14, 5 (2020), 1012-1023.
Y. Han, J. Kim, and K. Lee. 2017. Deep convolutional neural networks for predominant instrument recognition in polyphonic music. IEEE Trans. Audio, Speech and Language Processing 25, 1 (2017), 208-221.
Y. Li, M-C. Ching, and S. Lyu. In ictu oculi: Exposing ai created fake videos by detecting eye blinking. In Proc. IEEE WIFS, 2018.
Y. Li, W. Pei, and J. van Gemert. 2019. Push for Quantization: Deep Fisher Hashing. BMVC (2019).
Y. Wu, W. AbdAlmageed, and P. Natarajan. Mantra-net: Manipulation tracing network for detection and localization of image forgeries with anomalous features. In Proc. CVPR, pp. 9543-9552, 2019.
Z. Cao, M. Long, J. Wang, and P. S. Yu. Hashnet: Deep learning to hash by continuation. In Proc. CVPR, pp. 5608-5617, 2017.
Z. Lenyk and J. Park. Microsoft vision model resnet-50 combines web-scale data and multi-task learning to achieve state of the art. https://pypi.org/project/ microsoftvision/, 2021.
Z. Teed and J. Deng. Raft: Recurrent all-pairs field transforms for optical flow. In Proc. ECCV, pp. 402-419. Springer, 2020.
Maksym Andriushchenko and Nicolas Flammarion. Understanding and improving fast adversarial training. NeurIPS, 2020.
Maksym Andriushchenko, Francesco Croce, Nicolas Flammarion, and Matthias Hein. Square attack: a query-efficient black-box adversarial attack via random search. In ECCV, 2020.
Anish Athalye and Ilya Sutskever. Synthesizing robust adversarial examples. arXiv preprint arXiv:1707.07397, 2017.
Alexander Black, Tu Bui, Hailin Jin, Vishy Swaminathan, and John Collomosse. Deep image comparator: Learning to visualize editorial change. In Proceedings of the IEEE/CVF Conference on Computer Vision and Pattern Recognition (CVPR) Workshops, pp. 972-980, Jun. 2021.
T. Brown, D. Mane, A. Roy, M. Abadi, and J. Gilmer. Adversarial patch. arXivpreprintarXiv:1712.09665, 2017.
Shang-Tse Chen, Cory Cornelius, Jason Martin, and Duen Horng Chau. ShapeShifter: Robust physical adversarial attack on faster r-CNN object detector. In Machine Learning and Knowledge Discovery in Databases, pp. 52-68. Springer International Publishing, 2019. doi: 10.1007/978-3-030-10925-7 4.
Ting Chen, Simon Kornblith, Mohammad Norouzi, and Geoffrey Hinton. A simple framework for contrastive learning of visual representations. In International conference on machine learning, pp. 1597-1607. PMLR, 2020.
Gavin Weiguang Ding, Luyu Wang, and Xiaomeng Jin. AdverTorch v0.1: An adversarial robustness toolbox based on pytorch. arXiv preprint arXiv:1902.07623, 2019.
Brian Dolhansky and Cristian Canton Ferrer. Adversarial collision attacks on image hashing functions. CVPR Workshop on Adversarial Machine Learning, 2021.
Logan Engstrom, Andrew Ilyas, Shibani Santurkar, Dimitris Tsipras, Brandon Tran, and Aleksander Madry. Adversarial robustness as a prior for learned representations. arXiv preprint arXiv:1906.00945, 2019.
Kevin Eykholt, Ivan Evtimov, Earlence Fernandes, Bo Li, Dawn Song, Tadayoshi Kohno, Amir Rahmati, Atul Prakash, and Florian Tramer. Note on attacking object detectors with adversarial stickers. arXiv preprint arXiv:1712.08062, 2017.
I. Goodfellow, J. Shlens, and C. Szegedy. Explaining and harnessing adversarial examples. arXiv preprint arXiv:1412.6572v3, 2014.
Dou Goodman, Hao Xin, Wang Yang, Wu Yuesheng, Xiong Junfeng, and Zhang Huan. Advbox: a toolbox to generate adversarial examples that fool neural networks. arXiv preprint arXiv:2001.05574, 2020.
Sven Gowal, Chongli Qin, Jonathan Uesato, Timothy Mann, and Pushmeet Kohli. Uncovering the limits of adversarial training against norm-bounded adversarial examples. arXiv, 2020.
Kaiming He, Xiangyu Zhang, Shaoqing Ren, and Jian Sun. Deep residual learning for image recognition. In CVPR, 2016.
Silvan Heller, Luca Rossetto, and Heiko Schuldt. The ps-battles dataset—an image collection for image manipulation detection. arXiv preprint arXiv:1804.04866, 2018.

(56) References Cited

OTHER PUBLICATIONS

Dan Hendrycks and Thomas Dietterich. Benchmarking neural network robustness to common corruptions and perturbations. In ICLR, 2019.
Dan Hendrycks, Norman Mu, Ekin D. Cubuk, Barret Zoph, Justin Gilmer, and Balaji Lakshminarayanan. Augmix: A simple data processing method to improve robustness and uncertainty. ICLR, 2020.
A. Ilyas, L. Engstrom, A. Athalye, and J. Lin. Black-box adversarial attacks with limited queries and information. In ICML, 2018.
Minseon Kim, Jihoon Tack, and Sung Ju Hwang. Adversarial self-supervised contrastive learning. NeurIPS, 2020.
A. Krizhevsky, I. Sutskever, and G. Hinton. Imagenet classification with deep convolutional neural networks. Communications of the ACM, 60(6):84-90, 2017.
Alexey Kurakin, Ian Goodfellow, and Samy Bengio. Adversarial examples in the physical world. arXiv preprint arXiv:1607.02533, 2016.
Aleksander Madry, Aleksandar Makelov, Ludwig Schmidt, Dimitris Tsipras, and Adrian Vladu. Towards deep learning models resistant to adversarial attacks. In ICLR, 2018.
Marco Melis, Ambra Demontis, Maura Pintor, Angelo Sotgiu, and Battista Biggio. secml: A python library for secure and explainable machine learning. arXiv preprint arXiv:1912.10013, 2019.
S.-M. Moosavi-Dezfooli, A. Fawzi, and P. Frossard. Deepfool: a simple and accurate method to fool deep neural networks. In Proceedings of the IEEE Conference on Computer Vision and Pattern Recognition, pp. 2574-2582, 2016.
Eric Nguyen, Tu Bui, Vishy Swaminathan, and John Collomosse. Oscar-net: Object-centric scene graph attention for image attribution. ICCV, 2021.
Maria-Irina Nicolae, Mathieu Sinn, Minh Ngoc Tran, Beat Buesser, Ambrish Rawat, Martin Wistuba, Valentina Zantedeschi, Nathalie Baracaldo, Bryant Chen, Heiko Ludwig, Ian Molloy, and Ben Edwards. Adversarial robustness toolbox v1.2.0. arXiv preprint arXiv:1807.01069, 2018.
N. Papernot, P. McDaniel, and I. Goodfellow. Transferability in machine learning: from phenomena to black-box attacks using adversarial samples. arXiv preprint arXiv:1605.07277, 2016.
Nicolas Papernot, Fartash Faghri, Nicholas Carlini, Ian Goodfellow, Reuben Feinman, Alexey Kurakin, Cihang Xie, Yash Sharma, Tom Brown, Aurko Roy, Alexander Matyasko, Vahid Behzadan, Karen Hambardzumyan, Zhishuai Zhang, Yi-Lin Juang, Zhi Li, Ryan Sheatsley, Abhibhav Garg, Jonathan Uesato, Willi Gierke, Yinpeng Dong, David Berthelot, Paul Hendricks, Jonas Rauber, and Rujun Long. Technical report on the cleverhans v2.1.0 adversarial examples library. arXiv preprint arXiv:1610.00768, 2018.
Jonas Rauber, Wieland Brendel, and Matthias Bethge. Foolbox: A python toolbox to benchmark the robustness of machine learning models. In ICML Reliable Machine Learning in the Wild Workshop, 2017.
Leonard Rosenthol, Andy Parsons, Eric Scouten, Jatin Aythora, Bruce MacCormack, Paul England, Marc Levallee, Jonathan Dotan, Sherif Hanna, Hany Farid, and Sam Gregory. The content authenticity initiative: Setting the standard for digital content attribution. Technical report, Content Authenticity Initiative, Aug. 2020.
Parsa Saadatpanah, Ali Shafahi, and Tom Goldstein. Adversarial attacks on copyright detection systems. In ICML, 2020.
C. Szegedy, W. Liu, Y. Jia, P. Sermanet, S. Reed, D. Anguelov, D. Erhan, V. Vanhoucke, and A. Rabinovich. Going deeper with convolutions. In Proceedings of the IEEE conference on computer vision and pattern recognition, pp. 1-9, 2015.
Christian Szegedy, Wojciech Zaremba, Ilya Sutskever, Dumitru Erhan Joan Bruna, Ian Goodfellow, and Rob Fergus. Intriguing properties of neural networks. In ICLR, 2013.
Alex Tamkin, Mike Wu, and Noah Goodman. Viewmaker networks: Learning views for unsupervised representation learning. In ICLR, 2021. URL https://openreview.net/forum?id=enoVQWLsfyL.
S. Thys, W. Van Ranst, and T. Goedeme. Fooling automated surveillance cameras: adversarial patches to attack person detection. arXiv preprint arXiv:1904.08653, 2019.
Yonglong Tian, Chen Sun, Ben Poole, Dilip Krishnan, Cordelia Schmid, and Phillip Isola. What makes for good views for contrastive learning? NeurIPS, 2020.
Giorgos Tolias, Filip Radenovic, and Ondrej Chum. Targeted mismatch adversarial attack: Query with a flower to retrieve the tower. In Proceedings of the IEEE/CVF International Conference on Computer Vision, pp. 5037-5046, 2019.
D. Tsipras, S. Santurkar, L. Engstrom, A. Turner, and A. Madry. Robustness may be at odds with accuracy. In ICLR, 2019.
Eric Wong, Leslie Rice, and J. Zico Kolter. Fast is better than free: Revisiting adversarial training. ICLR, 2020.
Hongyang Zhang, Yaodong Yu, Jiantao Jiao, Eric P. Xing, Laurent El Ghaoui, and Michael I. Jordan. Theoretically principled trade-off between robustness and accuracy. In ICML, 2019.

\* cited by examiner

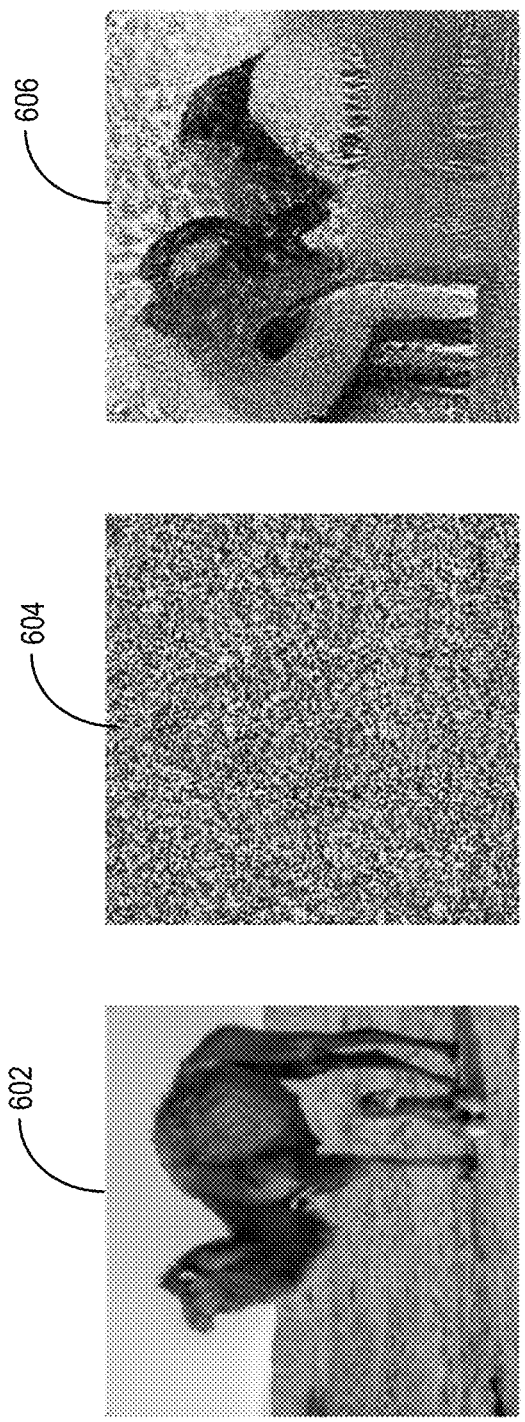

Determining A Contrastive Loss Between A Digital Image And A First Augmented Digital Image; 910
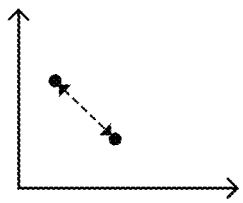
Generating A Second Augmented Digital Image By Selecting A Second Digital Image Augmentation According To A First Objective Function; And 920
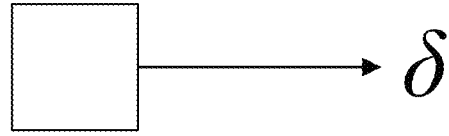
Modifying Parameters Of A Deep Visual Fingerprinting Model According To A Second Objective Function 930
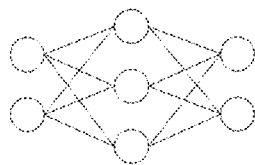
*Fig. 9*

ADVERSARIALLY ROBUST VISUAL FINGERPRINTING AND IMAGE PROVENANCE MODELS

BACKGROUND

Recent years have seen significant advancements in computer-implemented models for retrieving and identifying digital images. For example, conventional systems can utilize image hashing models to generate digital image hashes reflecting the contents of a digital image. Conventional systems can then utilize these models and corresponding hashes to identify digital images sharing a common source. For instance, conventional systems can match or attribute an image back to a trusted source to improve awareness of digital image origins. Despite these advances, however, many conventional image modification systems continue to demonstrate a number of deficiencies, particularly in accuracy, security, flexibility, and efficiency of implementing computing devices. For example, conventional image hashing models are vulnerable to a variety of adversarial attacks from adversarial images that exhibit carefully crafted patterns to induce errors.

SUMMARY

This disclosure describes one or more embodiments of systems, methods, and non-transitory computer readable media that solve one or more of the foregoing or other problems in the art with a deep visual fingerprinting model that utilizes robust contrastive learning to more accurately, securely, flexibly, and efficiently retrieve matching digital images and determine image provenance information. For example, the disclosed systems prevent imperceptible adversarial attacks via robust contrastive learning that focuses on content authenticity. In particular, the disclosed systems utilize an efficient learning procedure that leverages training on bounded adversarial examples (e.g., using the L-infinity norm) to more accurately identify digital images (including adversarial images) with a small computational overhead. The disclosed systems can flexibly extend to a variety of types of imperceptible perturbations, even those that are unseen during training.

For example, the disclosed systems utilize contrastive losses in conjunction with opposing objective functions to identify and learn features of difficult image cases. To illustrate, the disclosed systems utilize a first objective function that iteratively identifies augmentations to increase contrastive loss between a digital image and augmented digital images. Moreover, the disclosed systems utilize a second objective function that iteratively learns parameters of a deep visual fingerprinting model to reduce the contrastive loss. With these learned parameters, the disclosed systems utilize the deep visual fingerprinting model to generate hashes for digital images, more accurately retrieve and match digital images, and provide accurate digital image provenance information.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 6 illustrates structural features of inversions resulting from a hash inversion attack on the visual fingerprinting system in accordance with one or more embodiments;

FIG. 9 illustrates a flowchart of a series of acts for learning parameters of a deep visual fingerprinting model in accordance with one or more embodiments;

DETAILED DESCRIPTION

Figure 1:
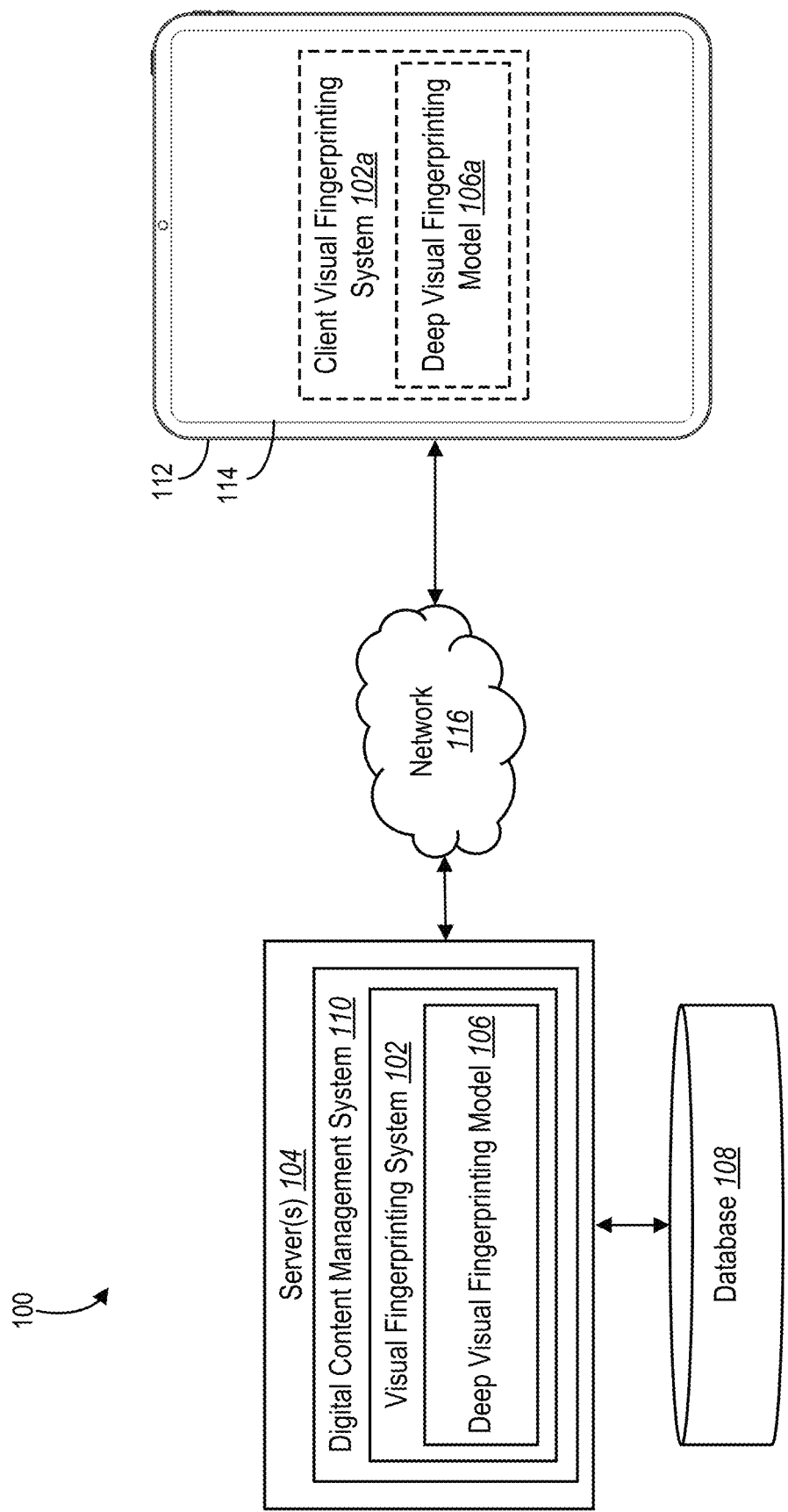
FIG. 1 illustrates an example system environment in which a visual fingerprinting system operates in accordance with one or more embodiments.

This disclosure describes one or more embodiments of an adversarially robust visual fingerprinting system that utilizes a deep visual fingerprinting model with parameters generated via robust contrastive learning to identify digital images and determine image provenance information. In particular, the visual fingerprinting system can generate an image hashing model that is robust not only to benign transformations but also to imperceptible adversarial examples. In one or more embodiments, the visual fingerprinting system leverages adversarial training using bounded adversarial examples (e.g., using the L-infinity norm). This efficient approach leads to a small computational overhead while significantly improving accuracy. Indeed, experimental results indicate significant robustness to a variety of types of imperceptible perturbations, including those that are unseen during training.

For example, the visual fingerprinting system utilizes robust contrastive learning and two objective functions to determine parameters of a deep visual fingerprinting model. In particular, the visual fingerprinting system utilizes a first objective function that selects digital image augmentations to utilize in training the deep visual fingerprinting model. Specifically, the visual fingerprinting system selects augmentations that increase (e.g., maximize) a contrastive loss relative to a digital image. The visual fingerprinting system utilizes backpropagation of a deep visual fingerprinting model to iteratively determine gradients and select digital image augmentations that increase the contrastive loss.

In one or more embodiments, the visual fingerprinting system also utilizes a second objective function to modify parameters of a deep visual fingerprinting model. For example, as just mentioned, the visual fingerprinting system determines a digital image augmentation that increases the contrastive loss. The visual fingerprinting system modifies parameters of the deep visual fingerprinting model to decrease the contrastive loss. Thus, the visual fingerprinting system utilizes the contrastive loss to select digital image augmentations that reflect difficult cases for the deep visual fingerprinting model to differentiate and then utilizes the contrastive loss to learn parameters of the deep visual fingerprinting model and distinguish between these cases.

In one or more embodiments, the visual fingerprinting system generates a binary hash for the visual fingerprint of a digital image. Accordingly, the visual fingerprinting system can also generate a hashing term to further learn parameters of the deep visual fingerprinting model. For example, to extract useful hashes from a contrastively trained model, the visual fingerprinting system utilizes a hashing term as part of the training objective. In particular, the visual fingerprinting system determines a hashing term reflecting a difference between a feature vector of a digital image and a hash of the feature vector. The visual fingerprinting system learns parameters of the deep visual fingerprinting model (i.e., a deep visual hashing model) based on both the contrastive loss and the hashing term.

In one or more embodiments, the visual fingerprinting system also utilizes a deep visual fingerprinting model to identify matching digital images and/or identify digital image provenance information. For example, the visual fingerprinting system utilizes the deep visual fingerprinting model to generate visual fingerprints (e.g., visual hashes) for a plurality of source digital images (e.g., digital images with known source data). The visual fingerprinting system monitors client device interactions with additional digital images (e.g., digital images accessed via client device applications or websites) and provide provenance information regarding these additional digital images. To illustrate, the visual fingerprinting system generates a visual fingerprint for a digital image shared on a social media site, compares the visual fingerprint to visual fingerprints for the plurality of source digital images, and identifies a matching digital image based on the comparison. The visual fingerprinting system can then utilize the source data for the matching digital image as provenance information for the new digital image (e.g., provide the provenance information for the digital image to the client device).

In some embodiments, the visual fingerprinting system also generates and provides a manipulation prediction for a digital image. For example, upon identifying a matching digital image, the visual fingerprinting system utilizes an image comparison model to determine modifications between a particular digital image and a matching digital image. To illustrate, the image comparison model generates a manipulation prediction (e.g., manipulated or not manipulated) and provide the manipulation prediction for display with the digital image and other provenance information. Accordingly, the visual fingerprinting system can train a deep neural network to create a robust image fingerprint invariant to kinds of transformation that digital content undergoes during redistribution (e.g., transcoding) but that is still sensitive to content change.

As mentioned above, conventional systems have a number of technical shortcomings with regard to accuracy, security, flexibility, and efficiency. For example, although conventional systems can encode and retrieve digital images, conventional systems are often fooled by adversarial attacks such that these encoded features will match inaccurate digital images (or fail to match any digital images). Recent research has illustrated that adversarial models can generate adversarial images that fool conventional image retrieval and hashing models. For example, adversarial models can exactly match the perceptual hashes of unrelated images by using small $l_2$ or $l_\infty$ adversarial perturbations. Indeed, this problem is "symmetric" in that attackers can generate digital images that will fool models and/or poison a database of images (e.g., that would lead to incorrect matching of benign images as copyrighted content). Thus, these adversarial models undermine the security and accuracy of conventional systems that match digital images and provide provenance data.

Some conventional systems seek to avoid these adversarial attacks through a security-by-obscurity approach. In particular, if the attacker does not know the model and cannot repeatedly query the model, then it is more difficult to generate adversarial images. Although this approach is easy to implement, it undermines flexibility and is not fully reliable. Indeed, models for image fingerprinting are increasingly deployed to client devices. Such deployment means that attackers can reverse engineer these models and gain white-box access for generating adversarial attacks. Accordingly, conventional approaches rigidly limit deployment options or undermine reliability of conventional systems that seek to avoid adversarial attacks.

Furthermore, many conventional systems are already computationally expensive to train and implement. For example, training large-scale models on millions of digital images already requires significant computer resources (in processing power and memory). Conventional systems have not identified an approach to address these adversarial attacks, in part, because any solution would make the computational burden of implementing models prohibitively expensive.

As suggested above, embodiments of the visual fingerprinting system can provide a variety of advantages over conventional image modification systems. For example, embodiments of the visual fingerprinting system can improve accuracy and security by utilizing robust comparative learning to generate fingerprinting models that address adversarial attacks. Indeed, the visual fingerprinting system can train a deep visual fingerprinting model utilizing multiple objective functions that generate learned parameters for creating accurate visual fingerprints that undermine adversarial attacks. As explained in greater detail below, the visual fingerprinting system can reduce the success rate for adversarial attacks from 85% to 0.8% in some cases.

The visual fingerprinting system can also improve flexibility and reliability. As an initial matter, the visual fingerprinting system can deploy deep visual fingerprinting models server-side or client-side. Furthermore, the robust comparative learning approach can generate flexible deep visual fingerprinting models that can avoid a variety of different types of adversarial attacks. For example, the visual fingerprinting system can generate deep visual fingerprinting models generalize to a variety of types of imperceptible perturbations (e.g., $l_2$ perturbations or larger $l_\infty$ perturbations) unseen during training.

Moreover, the visual fingerprinting system can achieve the foregoing improvements without undermining efficiency of implementing systems. As mentioned above, the visual fingerprinting system can utilize an objective function to iteratively select digital image augmentations to increase contrastive loss. Theoretically, the complexity of this approach grows linearly with the number of iterations. However, researchers have discovered that in practice, the visual fingerprinting system requires significantly less overhead. Indeed, in one experiment the visual fingerprinting system experienced a 2.3× computational overhead where linear complexity would have dictated a 4× increase. This observed level of overhead allows implementing devices to readily conduct large-scale experiments, training, and implementation.

Additional detail regarding the interactive image editing system will now be provided with reference to the figures. For example, FIG. 1 illustrates a schematic diagram of an example system environment (or "environment") 100 for implementing a visual fingerprinting system 102 in accordance with one or more embodiments. An overview of the visual fingerprinting system 102 is described in relation to FIG. 1. Thereafter, a more detailed description of the components and processes of the visual fingerprinting system 102 is provided in relation to the subsequent figures.

As shown, the environment 100 includes server(s) 104, a database 108, a client device 112, and a network 116. Each of the components of the environment communicate via the network 116, and the network 116 is any suitable network over which computing devices communicate. Example networks are discussed in more detail below in relation to FIG. 10.

As mentioned, the environment 100 includes a client device 112. The client device 112 is one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single instance of the client device 112, in some embodiments, the environment 100 includes multiple different client devices, each associated with a different user. The client device 112 communicates with the server(s) 104 via the network 116. For example, the client device 112 provides information to server(s) 104 indicating client device interactions (e.g., digital image selections, user interactions with one or more pixels of a digital image, or other input) and receives information from the server(s) 104 such as provenance information, a manipulation prediction, and/or digital images. Thus, in some cases, the visual fingerprinting system 102 implemented via the server(s) 104 provides and receives information based on client device interaction via the client device 112.

As shown in FIG. 1, the client device 112 includes a client application 114. In particular, the client application 114 is a web application, a native application installed on the client device 112 (e.g., a mobile application, a desktop application, etc.), or a cloud-based application where all or part of the functionality is performed by the server(s) 104. Based on instructions from the client application 114, the client device 112 presents or displays information to a user, including digital images, provenance information, and/or manipulation information.

As illustrated in FIG. 1, the environment 100 includes the server(s) 104. The server(s) 104 generates, tracks, stores, processes, receives, and transmits electronic data, such as digital images, image fingerprints, and/or provenance information. For example, the server(s) 104 receives data from the client device 112 in the form of an indication of a client device interaction with a digital image. In response, the server(s) 104 transmits data to the client device 112 to cause the client device 112 to display or present provenance information for the digital image. The server(s) 104 can also monitor creation of digital images at the client device 112, receive digital images from the client device 112, and generate/store provenance information corresponding to the digital images.

In some embodiments, the server(s) 104 communicates with the client device 112 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, a multidimensional server, or a machine learning server. The server(s) 104 can further access and utilize the database 108 to store and retrieve information such as digital images, digital image fingerprints, provenance information, augmented digital images, deep visual fingerprinting models, comparator models, and/or manipulation information.

As further shown in FIG. 1, the server(s) 104 also includes the visual fingerprinting system 102 as part of a digital content management system 110. For example, in one or more implementations, the digital content management system 110 can store, generate, modify, edit, enhance, provide, distribute, and/or share digital content, such as digital images. For example, the digital content management system 110 provides tools for the client device 112, via the client application 114, to display or manipulate pixels of digital images. In some implementations, the digital content management system 110 provides tools for refining digital images or displaying provenance information regarding digital images.

In one or more embodiments, the server(s) 104 includes all, or a portion of, the visual fingerprinting system 102. For example, the visual fingerprinting system 102 operates on the server(s) 104 to identify matching digital images, determine provenance information, and provide provenance information to the client device 112. As illustrated, the visual fingerprinting system 102 can also include a deep visual fingerprinting model 106 to generate fingerprints of digital images. These fingerprints can be utilized to determine matching digital images and corresponding provenance information.

In certain cases, the client device 112 includes all or part of the visual fingerprinting system 102. Indeed, as illustrated, the client device 112 can include a client visual fingerprinting system 102*a* with a deep visual fingerprinting model 106*a* with the same or similar functionality to the visual fingerprinting system 102. For example, the client device 112 can generate, obtain (e.g., download), or utilize one or more aspects of the visual fingerprinting system 102, such as the deep visual fingerprinting model 106*a*. Indeed, in some implementations, as illustrated in FIG. 1, the visual fingerprinting system 102 is located in whole or in part of the client device 112. For example, the client visual fingerprinting system 102*a* includes a web hosting application that allows the client device 112 to interact with the server(s) 104. To illustrate, in one or more implementations, the client device 112 accesses a web page supported and/or hosted by the server(s) 104.

For example, in some embodiments, the visual fingerprinting system 102 trains the deep visual fingerprinting model 106 via the server(s) 104. The server(s) 104 can provide the deep visual fingerprinting model 106 to the client device 112 for generating image fingerprints. In other embodiments, the server(s) 104 both train and implement the deep visual fingerprinting model 106. For example, the server(s) 104 can receive a digital image from the client device 112, generate a visual fingerprint of the digital image, compare the visual fingerprint to other visual fingerprints to identify a matching digital image, and provide provenance information corresponding to the matching digital image to the client device 112.

Although FIG. 1 illustrates a particular arrangement of the environment, in some embodiments, the environment has a different arrangement of components and/or may have a different number or set of components altogether. For instance, as mentioned, the visual fingerprinting system 102 is implemented by (e.g., located entirely or in part on) the client device 112. In addition, in one or more embodiments, the client device 112 communicates directly with the visual fingerprinting system 102, bypassing the network 116.

Figure 2A:
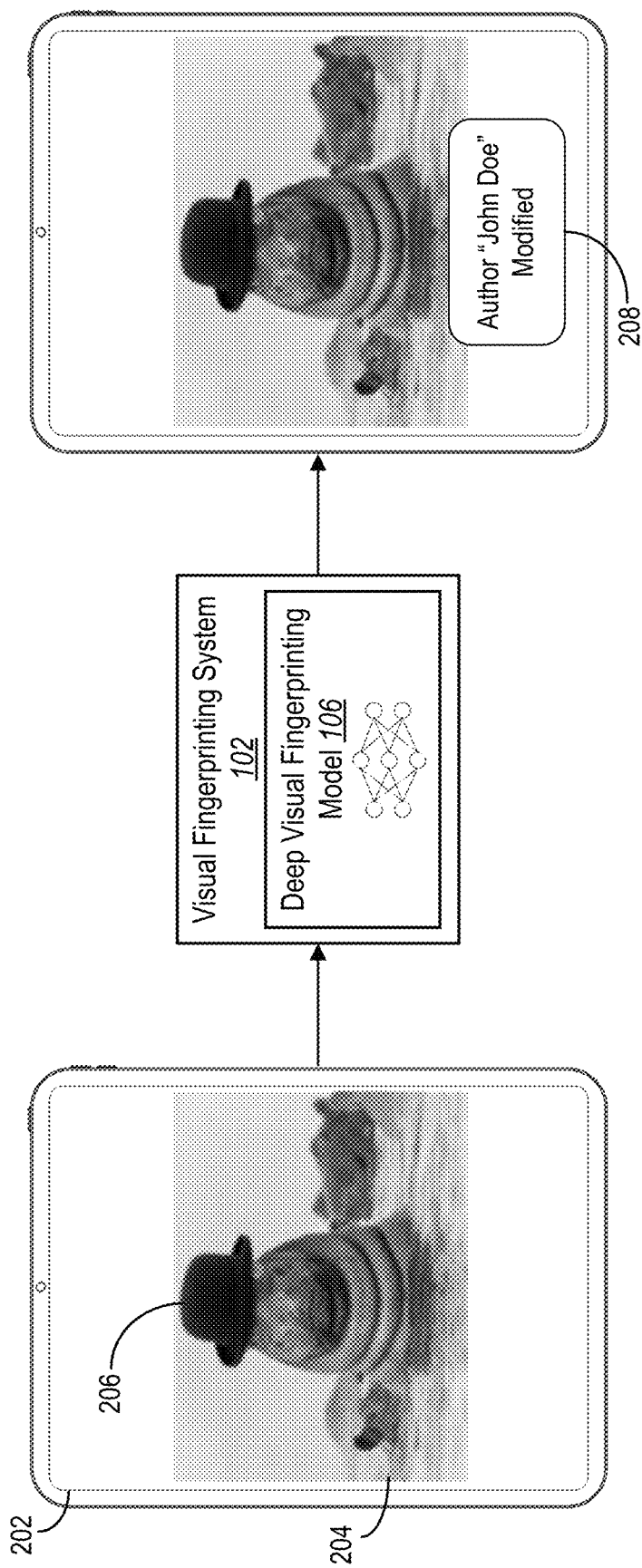
FIG. 2A illustrates an overview of determining and providing provenance information for a digital image in accordance with one or more embodiments.

As mentioned, in one or more embodiments, the visual fingerprinting system 102 utilizes a deep visual fingerprinting model to search for matching digital images and/or determine provenance information. FIG. 2A illustrates an overview of determining and providing provenance information in accordance with one or more embodiments.

For example, FIG. 2A illustrates the visual fingerprinting system 102 generating and providing, for display, provenance information 208 corresponding to a digital image 204. In particular, as shown, a client device 202 accesses and displays the digital image 204. The digital image 204 has been modified from its original source. Specifically, the digital image 204 includes a modification 206 (e.g., the addition of a black hat). In response to user interaction with the digital image 204, the visual fingerprinting system 102 can identify a matching digital image and determine the provenance information 208.

The digital image 204 can include a variety of digital visual representations (e.g., a digital graphics file that when rendered displays one or more objects or scenes). For example, in various implementations, the digital image 204 is made up of pixels that group together to form a visual representation. The digital image 204 can also include a frame of a digital video or a visual portion of another digital creative (e.g., a sub-portion of a digital document).

The visual fingerprinting system 102 utilizes the deep visual fingerprinting model 106 to generate a visual fingerprint from the digital image 204. A visual fingerprint refers to a digital identifier of a digital image. In particular, a visual fingerprint can include an encoding, vector, or hash (e.g., binary hash value) that identifies a digital image. To illustrate, a visual fingerprint can include a binary hash value of a digital image, such that duplicate copies of the digital image will have the same binary hash value.

The visual fingerprinting system 102 compares the visual fingerprint for the digital image 204 with visual fingerprints of other digital images (e.g., digital images and visual fingerprints stored at the database 108). By comparing these visual fingerprints, the visual fingerprinting system 102 can determine a matching digital image (e.g., a source digital image for the digital image 204). The visual fingerprinting system 102 can also determine source data for the matching digital image.

The term matching digital image can include a digital image that matches another digital image (e.g., that matches the digital image 204). For example, the visual fingerprinting system 102 can receive the digital image 204 from the client device and determine that the digital image 204 is a copy of (or modification of) a second digital image. The second digital image is referred to as a matching digital image.

Similarly, the term source digital image refers to a digital image with known provenance information (e.g., known source data). For example, a source digital image can include digital images stored in a database with a reference or link to a provenance information. In some embodiments, a source digital image can include provenance data (e.g., stored in metadata of the digital image). Thus, the visual fingerprinting system 102 can identify a matching digital image that is also a source digital image (having provenance information) for the digital image 204.

In relation to FIG. 2A, the visual fingerprinting system 102 identifies a matching digital image (e.g., without the modification 206). The visual fingerprinting system 102 identifies provenance information for the matching digital image (e.g., the author or creator of the matching digital image). In response, the visual fingerprinting system 102 provides this information for display as the provenance information 208 via a user interface of the client device 202.

The provenance information 208 (e.g., source data) can include a variety of digital information identifying the source, origin, creation, or history of a digital image. For example, the provenance information 208 can indicate an author, creator, owner, copyright holder, publisher, or creation location of a digital image. The provenance information 208 can also include revision information (e.g., versions, revisions, and/or revision dates). Thus, the provenance information 208 can include a variety of information for providing correct attribution for a digital image.

As shown, the provenance information 208 also includes a manipulation prediction. Specifically, the provenance information 208 includes an indication that the digital image 204 has been modified relative to its source image (e.g., the matching digital image). In particular, the visual fingerprinting system 102 utilizes an image comparator model to analyze the digital image 204 and a matching digital image to generate the manipulation prediction. Thus, the visual fingerprinting system 102 can identify a matching digital image and provenance information and/or manipulation information for display via the client device 202.

Although FIG. 2A illustrates the visual fingerprinting system 102 generating and providing provenance information, the visual fingerprinting system 102 can be utilized in a variety of alternative implementations. For example, in some embodiments, the visual fingerprinting system 102 can be implemented in digital image search/matching applications. In particular, instead of identifying provenance information, the visual fingerprinting system 102 can identify matching digital images and provide the matching digital images for display. Moreover, although FIG. 2A illustrates providing provenance information for display via a client device, in some embodiments, the visual fingerprinting system 102 need not provide information for display. For instance, the visual fingerprinting system 102 can identify a matching digital image and/or determine a modification prediction and provide this information to a database (e.g., a copyright violation database) for later retrieval and usage.

Similarly, the visual fingerprinting system 102 can provide a notification to an author, owner, copyright holder indicating that the digital image 204 has been utilized and/or modified. For example, the visual fingerprinting system 102 can identify an owner of a digital image via the database 108. The visual fingerprinting system 102 can generate and provide an email, text message, pop-up notification, or other digital communication to the owner of the digital image indicating a website or application utilizing the digital image 204. Similarly, the notification can include an indication of the modification prediction, an owner of the website or application utilizing the digital image 204, and/or a selectable option to report an unauthorized use of the digital image 204.

Figure 2B:
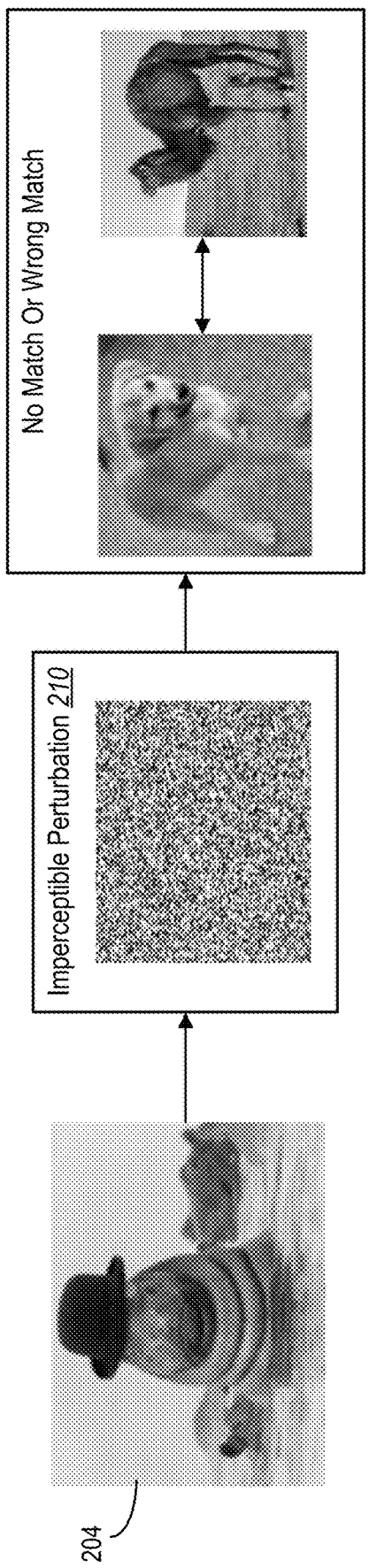
FIG. 2B illustrates an adversarial attack to interrupt accurate retrieval of matching digital images and identification of provenance information.

As mentioned above, the visual fingerprinting system 102 can operate to more accurately, efficiently, and flexibly identify matching digital images, even in response to adversarial attacks. FIG. 2B illustrates an adversarial attack in accordance with one or more embodiments. In particular, FIG. 2B illustrates application of an imperceptible perturbation 210 to the digital image 204. This imperceptible perturbation 210 confuses conventional systems such that they cannot identify a matching digital image or identify an incorrect matching digital image.

Specifically, the goal of the attacker is to cause an image hashing model to not identify the original counterpart of the digital image 204 as a top result. If the image hashing model cannot properly identify a source digital image, then an image comparator model will only be applied on non-matching pairs. Thus, with this attack, conventional systems cannot identify provenance information and cannot clearly say that the digital image 204 has been manipulated. Accordingly, it may appear that this image has not been indexed and is an original creation instead of a modified version of an existing digital image.

Figure 3:
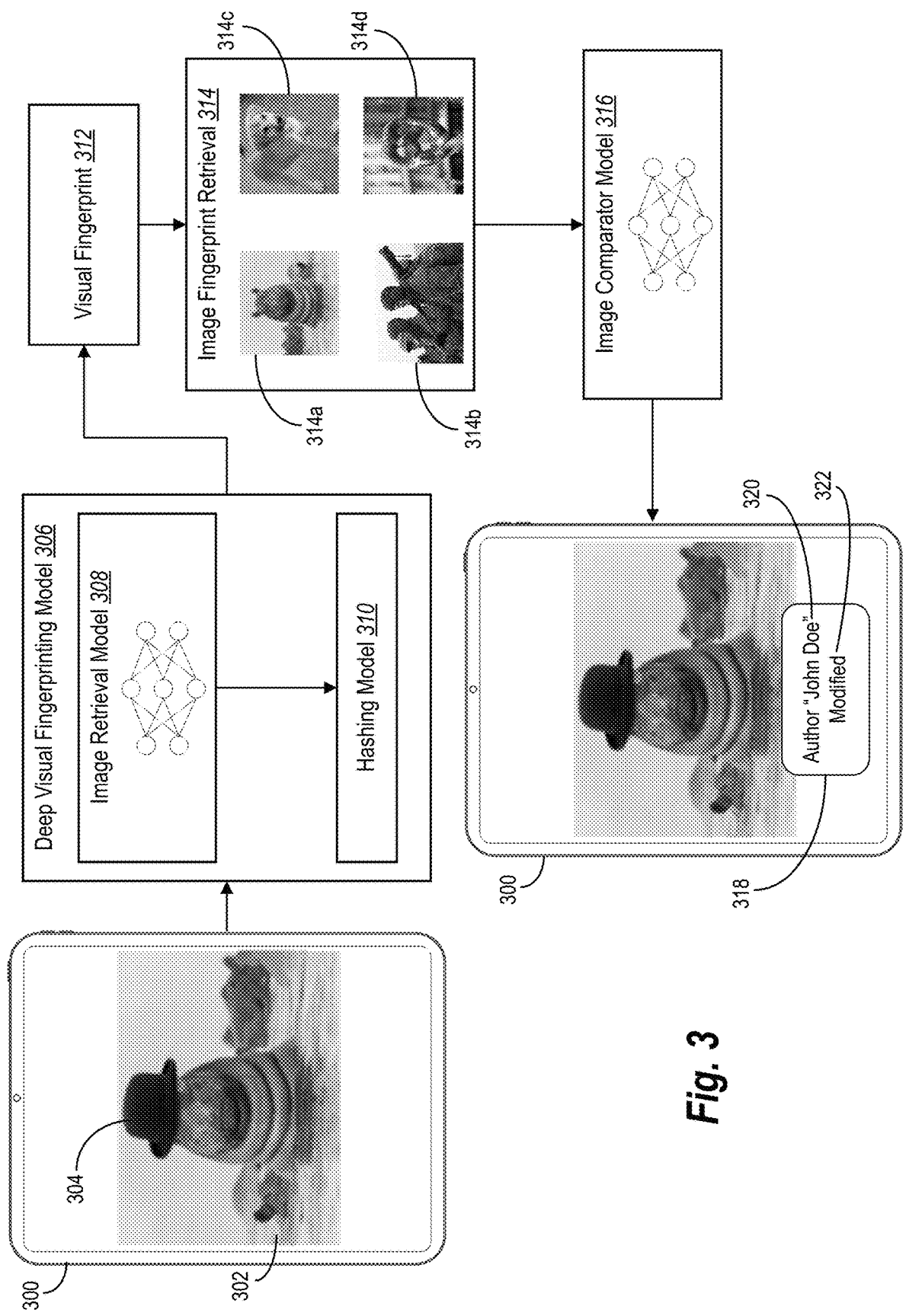
FIG. 3 illustrates the visual fingerprinting system generating visual fingerprints and providing provenance information for display in accordance with one or more embodiments.

As mentioned, the visual fingerprinting system 102 can utilize a deep visual fingerprinting model to overcome such adversarial attacks. FIG. 3 provides additional detail regarding utilizing a deep visual fingerprinting model 306 to more accurately identify matching digital images. Specifically, FIG. 3 illustrates a client device 300 displaying a digital image 302 (e.g., the digital image 204) having a modification 304 (e.g., the modification 206). As illustrated, the visual fingerprinting system 102 utilizes the deep visual fingerprinting model 306 to generate a visual fingerprint 312.

The deep visual fingerprinting model 306 can include a variety of machine learning models for generating a visual fingerprint (e.g., a computer-implemented model that can be trained and/or tuned based on inputs to determine classifications or approximate unknown functions). For instance, the deep visual fingerprinting model 306 can include a decision tree model, a support vector machine, or a neural network.

To illustrate, the deep visual fingerprinting model 306 can be implemented as a neural network that comprises a model of interconnected artificial neurons (e.g., organized in layers having learned parameters or weights) that communicate and learn to approximate complex functions. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

The visual fingerprinting system 102 can utilize a variety of model architectures for the deep visual fingerprinting model 306. For instance, as illustrated in FIG. 3, the deep visual fingerprinting model 306 includes an image retrieval model 308 and a hashing model 310. The image retrieval model 308 can include a machine learning model (such as a neural network) that generates an embedding of a digital image (e.g., an embedding within an image/search feature space). The image retrieval model 308 can generate embeddings (e.g., vectors) such that matching digital images are located nearer in feature space than non-matching digital images. Accordingly, the image retrieval model 308 can match digital images to source digital images (i.e., retrieve source digital images).

In some embodiments, the image retrieval model 308 is a convolutional neural network. For example, the visual fingerprinting system 102 can utilize a Res-Net convolutional neural network (e.g., Res-Net 50) as the image retrieval model 308. The visual fingerprinting system 102 can train the convolutional neural network on a large dataset of unlabeled images to generate embeddings and retrieve matching digital images. More specifically, the visual fingerprinting system 102 can train the image retrieval model 308 utilizing a robust contrastive learning approach that utilizes opposing objectives to generate augmented digital images and modify parameters of the image retrieval model 308. Additional detail regarding training the deep visual fingerprinting model 306 are provided below (e.g., in relation to FIGS. 4A-4C).

As shown, the deep visual fingerprinting model 306 also includes the hashing model 310. The hashing model 310 can generate a binary hash for the digital image 302. Specifically, the hashing model 310 can convert an embedding from the image retrieval model 308 to a binary hash. In one or more embodiments, the hashing model 310 utilizes a sign function to generate a binary hash. In other embodiments, the hashing model 310 can utilize a variety of other perceptual hashing algorithms.

As illustrated, the deep visual fingerprinting model 306 generates the visual fingerprint 312. For example, the visual fingerprint 312 can include the binary hash generated from the hashing model 310. In one or more implementations, the deep visual fingerprinting model 306 does not include the hashing model 310. For example, the deep visual fingerprinting model 306 can utilize the image retrieval model 308 to generate embeddings. The visual fingerprinting system 102 can utilize these embeddings as the visual fingerprint 312.

Moreover, the visual fingerprinting system 102 can utilize the visual fingerprint 312 to identify one or more matching digital images. For example, as illustrated in FIG. 3, the visual fingerprinting system 102 can perform an act 314 of image fingerprint retrieval. Specifically, the visual fingerprinting system 102 can compare the visual fingerprint 312 with visual fingerprints of additional digital images 314a-314d. For example, the visual fingerprinting system 102 can generate visual fingerprints for the additional digital images 314a-314d (using the deep visual fingerprinting model 306). The visual fingerprinting system 102 can then compare the visual fingerprint 312 with the visual fingerprints for the additional digital images 314a-314d.

In one or more embodiments, the visual fingerprinting system 102 generates a database (e.g., the database 108) that includes the additional digital images 314a-314d (i.e., source digital images) with corresponding visual fingerprints and provenance information. Accordingly, the visual fingerprinting system 102 can compare the visual fingerprint 312 and visual fingerprints of the additional digital images 314a-314d to identify a matching digital image with corresponding provenance information. For example, in relation to FIG. 3, the visual fingerprinting system 102 determines that the additional digital image 314a is a matching digital image (e.g., a source digital image) for the digital image 302. In particular, the visual fingerprinting system 102 determines that the visual fingerprint for the additional digital image 314a is closest (e.g., most similar to) the visual fingerprint 312. This comparison can include a variety of approaches such as a binary hash comparison or determining a distance between vectors within a feature space.

The visual fingerprinting system 102 can also utilize an image comparator model 316 to determine a manipulation prediction for the digital image. The image comparator model 316 can include a variety of computer-implemented models for comparing digital images and generating a manipulation prediction (e.g., a prediction whether a digital image is a modified version of an original digital image). Thus, the image comparator model 316 can predict whether a pair of images is identical, different, or manipulated.

In some embodiments, the image comparator model 316 is a neural network trained to generate a manipulation prediction. The visual fingerprinting system 102 can utilize a variety of architectures for the image comparator model 316. In one or more embodiments, the visual fingerprinting system 102 utilizes the image comparator described by Alexander Black, Tu Bui, Hailin Jin, Vishy Swaminathan, and John Collomosse in Deep image comparator: Learning to visualize editorial change, Proceedings of the IEEE/CVF Conference on Computer Vision and Pattern Recognition (CVPR) Workshops, pages 972-980, June 2021 (hereinafter Deep image comparator), which is incorporated by reference herein in its entirety.

In one or more embodiments, the visual fingerprinting system 102 does not utilize the image comparator model 316. For instance, rather than utilizing the image comparator model 316, the visual fingerprinting system 102 can train the deep visual fingerprinting model 306 to separate manipulated digital images, which encourages matching to fail in the presence of content manipulation. Utilizing this approach, the visual fingerprinting system 102 can still match digital images to a trusted database of originals, invariant to benign (non-editorial) changes such as resolution, format or quality changes while excluding manipulated digital images from positive matches. For example, the visual fingerprinting system 102 can utilize a model architecture as described by Eric Nguyen, Tu Bui, Vishy Swaminathan, and John Collomosse in Oscar-net: Object-centric scene graph attention for image attribution, ICCV, 2021 which is incorporated by reference herein in its entirety.

As shown in FIG. 3, the visual fingerprinting system 102 can also provide a provenance element 318 via a user interface of the client device 300. In particular, the provenance element 318 includes provenance information 320 (e.g., name of the author or creator of the digital image 302) and a manipulation prediction 322 (e.g., an indication that the digital image 302 has been manipulated relative to its source digital image). The visual fingerprinting system 102 can provide the provenance information 320 and the manipulation prediction 322 for display with the digital image 302 via the user interface of the client device 300. In some embodiments, the visual fingerprinting system 102 can also illustrate differences between digital images (e.g., highlight the hat as the modified portion of the digital image 302). In this manner, the visual fingerprinting system 102 can illustrate attribution information for one or more digital images.

Figure 4A:
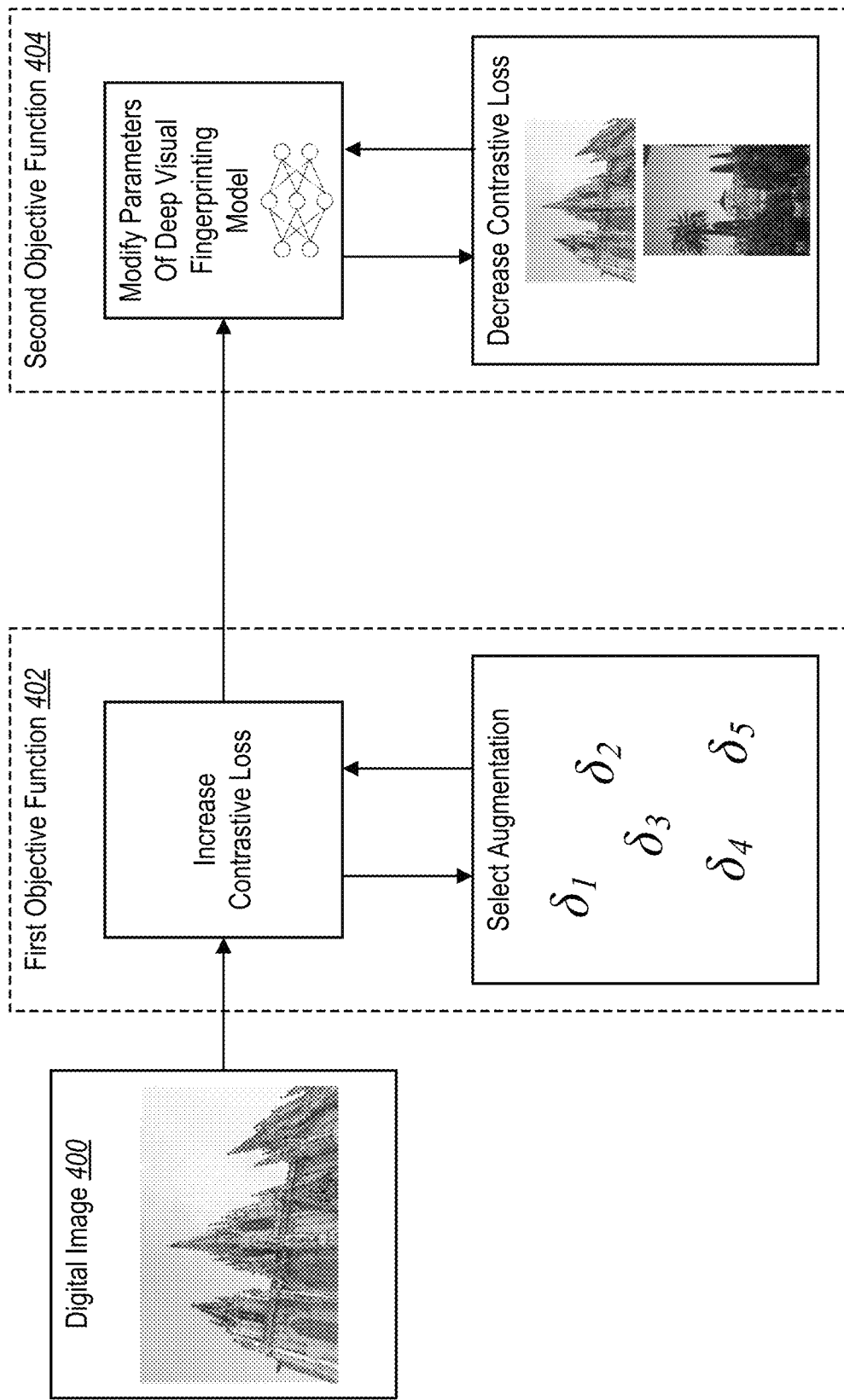
FIGS. 4A-4C illustrate learning parameters of a deep visual fingerprinting model in accordance with one or more embodiments.
Figure 4B:
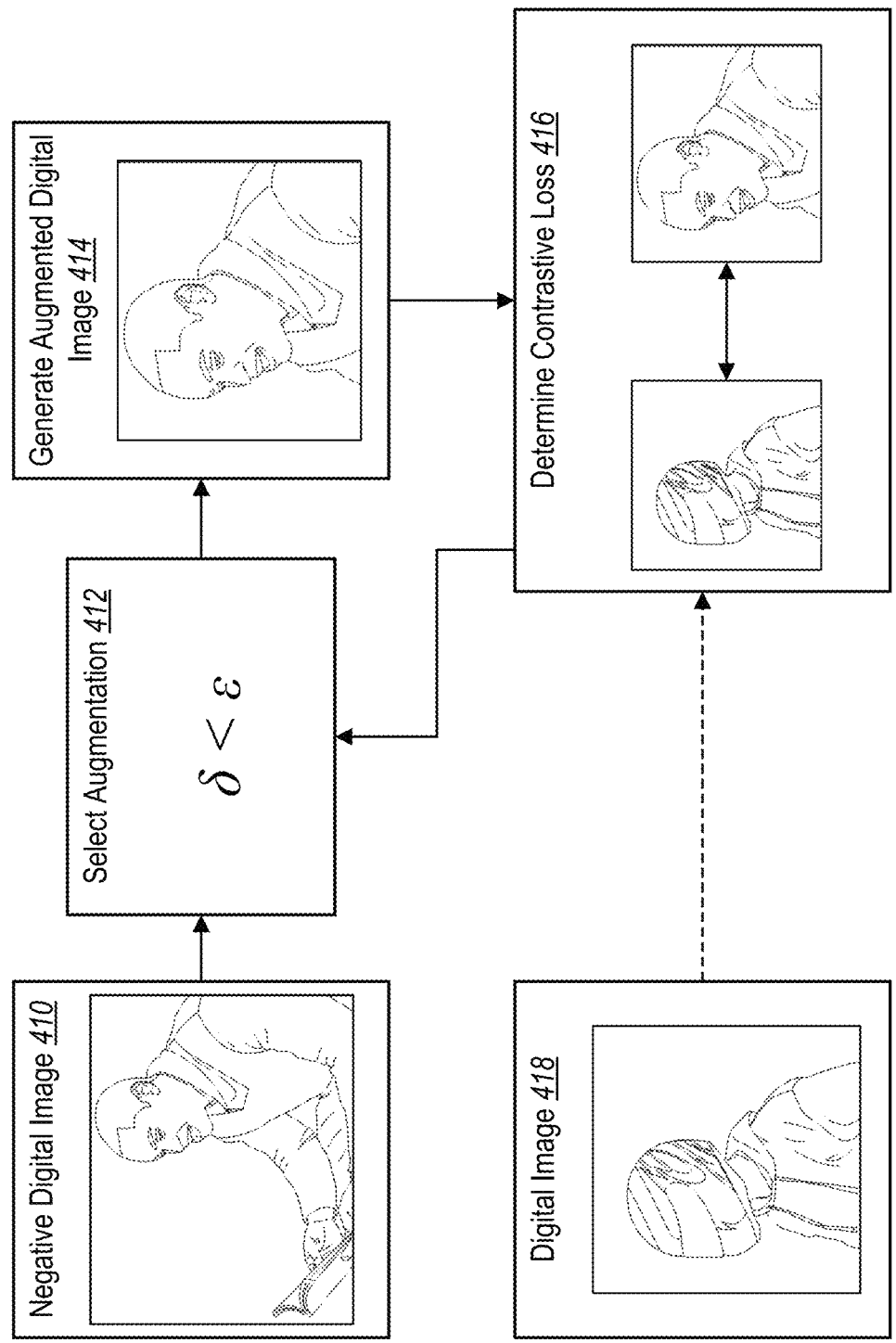
Figure 4C:
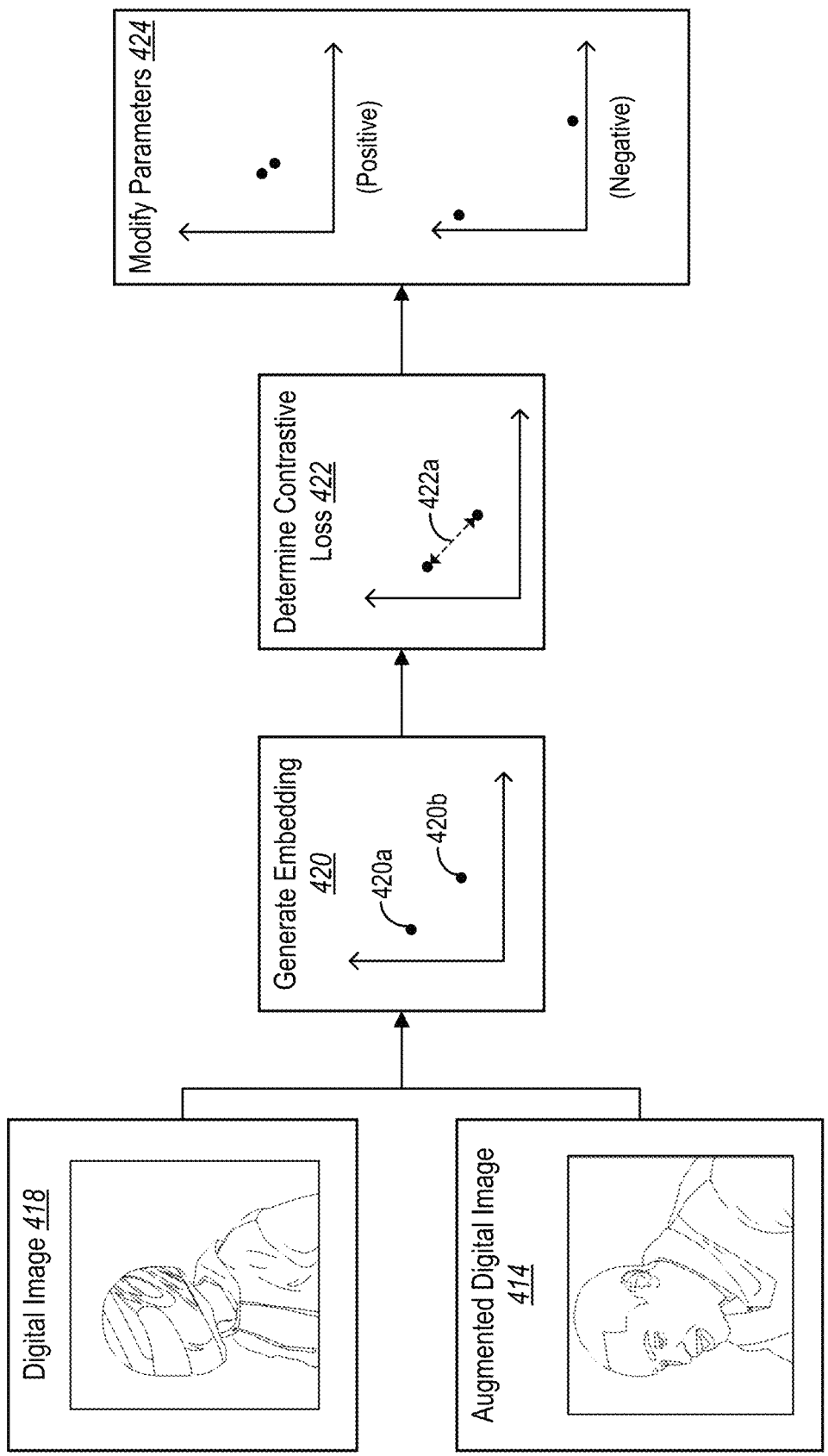

As mentioned above, the visual fingerprinting system 102 can utilize robust contrastive learning to train a deep visual fingerprinting model. In particular, the visual fingerprinting system 102 can generate a visual fingerprint of a digital image utilizing a deep visual fingerprinting model comprising parameters learned utilizing a contrastive loss between digital images and augmented digital images selected to increase the contrastive loss. FIGS. 4A-4C provide additional detail regarding this training approach in accordance with one or more embodiments. As shown in FIG. 4A, the visual fingerprinting system 102 can identify a digital image 400 for training the deep visual fingerprinting model. The visual fingerprinting system 102 can utilize a first objective function 402 and a second objective function 404 to generate and augmented digital image and modify parameters of the deep visual fingerprinting model. In the first objective function 402 the visual fingerprinting system 102 seeks to increase contrastive loss whereas in the second objective function 404, the visual fingerprinting system 102 seeks to decrease the contrastive loss.

As just mentioned, the visual fingerprinting system 102 can determine a measure of loss, such as a contrastive loss, to train a deep visual fingerprinting model. A loss can include a metric or value reflecting an error, inconsistency, or inaccuracy. For example, a loss can include a contrastive loss, a cross-entropy loss, an L1 loss, an L2 loss, mean squared error, or another measure of loss. The term contrastive loss refers to a loss that reflects a difference between two embeddings within a feature space. In particular, a contrastive loss includes a distance between two images (two image embeddings) within a feature space. For example, the visual fingerprinting system 102 can determine a contrastive loss by embedding two digital images (e.g., a digital image and an augmented digital image) into a feature space and determining the difference (or distance) between the two digital images. In one or more embodiments, the visual fingerprinting system 102 utilizes a contrastive loss corresponding to SimCLR loss as described by Ting Chen, Simon Kornblith, Mohammad Norouzi, and Geffrey Hinton in A simple framework for contrastive learning of visual representations, International conference on machine learning, pages 1597-1607, PMLR, 2020, incorporated by reference herein in its entirety. The term measure of loss (or measure of contrastive loss) refers to a particular instance or value for a loss (e.g., a particular contrastive loss value).

Thus, in relation to FIG. 4A, the visual fingerprinting system 102 can compare the digital image 400 with an augmented digital image to determine a measure of contrastive loss. As illustrate, the visual fingerprinting system 102 can generate the augmented digital image by selecting a digital image augmentation. The term digital image augmentation refers to a change, transformation, or modification to a digital image. For example, a digital image augmentation can include resizing, rotating, padding, cropping, flipping (e.g., horizontal or vertical flipping), translating, distorting, adding compression artifacts (e.g., JPEG compression), blurring, or modifying color features (e.g., hue, saturation, brightness). Thus, as shown in FIG. 4A (by the $\partial_i$ visualizations), the visual fingerprinting system 102 can select a particular digital image augmentation from a set of digital image augmentations.

The visual fingerprinting system 102 can select a digital image augmentation by increasing (e.g., maximizing) contrastive loss according to the first objective function 402. For example, the visual fingerprinting system 102 can select a first digital image augmentation and generate a first augmented digital image. For example, the visual fingerprinting system 102 can apply the first digital image augmentation to the digital image 400 (e.g., the initial digital image) or a negative digital image (e.g., another digital image with a different source). The visual fingerprinting system 102 can determine a measure of contrastive loss between the digital image 400 and the first augmented digital image. Specifically, the visual fingerprinting system 102 can utilize the deep visual fingerprinting model to generate visual fingerprints (e.g., embeddings/hashes) of the digital image and the first augmented digital image and compare the visual fingerprints to determine the measure of contrastive loss.

The visual fingerprinting system 102 can then select a second digital image augmentation based on the contrastive loss. In particular, the visual fingerprinting system 102 can select the second digital image to increase the contrastive loss. For instance, the visual fingerprinting system 102 can determine a gradient of the contrastive loss in relation to changing the digital augmentation and applying the deep visual fingerprinting model. The visual fingerprinting system 102 can select the second digital image augmentation based on this gradient to increase the contrastive loss (e.g., select the second digital image augmentation according to the first objective function utilizing the gradient). The visual fingerprinting system 102 can then generate a second augmented digital image utilizing the second digital image augmentation and determine a change to the contrastive loss. The visual fingerprinting system 102 can repeat this approach (e.g., iteratively selecting third, fourth, or more digital image augmentations based on determined gradients) to increase the contrastive loss.

As illustrated, the visual fingerprinting system 102 can also utilize the second objective function to modify parameters of the deep visual fingerprinting model. For example, upon selecting a final (converged) digital image augmentation, the visual fingerprinting system 102 can utilize the corresponding augmented digital image to modify parameters of the deep visual fingerprinting model. To illustrate, the visual fingerprinting system 102 can generate a first visual fingerprint for the selected augmented digital image and a second visual fingerprint for the digital image 400. The visual fingerprinting system 102 can determine a measure of contrastive loss between the two visual fingerprints (e.g., between vector representations within a feature space). The visual fingerprinting system 102 can then modify the parameters of the deep visual fingerprinting model to reduce the contrastive loss. Thus, the first objective function 402 selects digital image augmentations to increase contrastive loss (i.e., identify samples that are difficult use-cases) and the second objective function modifies internal parameters (e.g., neural network works in neural network layers) of the deep visual fingerprinting model to minimize the contrastive loss (i.e., to learn to distinguish the difficult use-cases).

FIG. 4B provides additional detail regarding the visual fingerprinting system 102 selecting a digital image augmentation in accordance with one or more embodiments. In particular, FIG. 4B illustrates iteratively selecting digital image augmentations to increase a contrastive loss between a digital image 418 and a negative digital image 410.

As described above, with regard to FIG. 4A, the visual fingerprinting system 102 can generate augmented digital images from a digital image (e.g., apply digital image augmentations to the same training digital image) or a negative digital image (e.g., apply augmentations to a different digital image). Increasing the contrastive loss can result in different approaches for these two implementations. For example, increasing contrastive loss in comparing a digital image and a negative digital image generally means moving the digital image and the negative digital image closer together within a feature space. Indeed, by moving the digital image and the negative digital image closer, the contrastive loss would increase (because the two images are not supposed to be together within the feature space).

Similarly, increasing contrastive loss between a digital image and a variant of the digital image generally means moving the digital image and its variant further away within the feature space. Indeed, by moving the same image further apart in the features space would increase the contrastive loss (because the two images are supposed to be close within the features space).

FIG. 4B illustrates the visual fingerprinting system 102 selecting digital image augmentations for the negative digital image 410. Accordingly, applying the first objective function 402 involves making the negative digital image 410 and the digital image 418 more similar (e.g., closer within features space). Accordingly, the visual fingerprinting system 102 performs the act 412 of selecting a digital image augmentation. The visual fingerprinting system 102 utilizes the digital image augmentation generate an augmented digital image 414. In particular, the visual fingerprinting system 102 applies the selected digital image augmentation to the negative digital image 410. As shown, the augmented digital image 414 reflects a translation and zoom making the augmented digital image 414 more similar to the digital image 418 to improve the generalization ability of the model.

The particular transformation shown in FIG. 4B is provided for illustrative purposes, but the magnitude of the transformation may not be representative of transformations applied by the visual fingerprinting system 102 in all embodiments. For example, in one or more embodiments, the visual fingerprinting system 102 limits transformations to particular thresholds to mimic non-editorial changes. Thus, with regard to a cropping augmentation, the visual fingerprinting system 102 can limit the transformation to 10% of the image area (or some other threshold, such as 5% or 15%). Because such small augmentations are difficult to illustrate, FIG. 4B shows a more exaggerated transformation.

The visual fingerprinting system 102 also performs an act 416 of determining a contrastive loss. In particular, the visual fingerprinting system 102 utilizes the deep visual hashing model (e.g., the image retrieval model 308 with or without the hashing model 310) to generate a visual fingerprint of the augmented digital image and the digital image 418. The visual fingerprinting system 102 then determine the contrastive loss by comparing the two visual fingerprints (e.g., by comparing embeddings within a feature space).

As shown, the visual fingerprinting system 102 can then repeat the act 412 based on the contrastive loss. In particular, the visual fingerprinting system 102 can backpropagate the contrastive loss through the deep visual fingerprinting network (relative to possible digital image augmentations) and determine a step of projected gradient ascent. The visual fingerprinting system 102 can then select an additional digital image augmentation that is projected to increase the contrastive loss.

As illustrated in FIG. 4B, the visual fingerprinting system 102 can select digital image augmentations at the act 412 subject to one or more constraints. Indeed, as shown, the visual fingerprinting system 102 can constrain the digital image augmentation to a particular threshold, magnitude, or radius. Specifically, in one or more embodiments, the visual fingerprinting system 102 constrains the digital image augmentation ($\delta_i$) to fall within an imperceptible perturbation radius (E). Indeed, as mentioned above (with regard to FIG. 2B), adversarial attackers often utilize imperceptible perturbations, such as L2 ($l_2$) or L-infinity ($l_\infty$) bounded perturbations with a small radius. The terms L2 or L-infinity refer to types of norms, which are different measures of size or length within a space. A norm of a particular value, p, includes the p-th root of a summation of all elements to the p-th power. For example, an L1 norm refers to the sum of the magnitudes of vectors in a space. An L2 norm (or Euclidian norm) refers to the shortest distance between two points in a space. An L-infinity norm refers to the largest magnitude among each element of a vector. In one or more embodiments, the visual fingerprinting system 102 limits the digital image augmentation at the act 412 to fall within an imperceptible perturbation radius according to the L-infinity norm.

As shown, the visual fingerprinting system 102 can repeat the acts 412-416. In some embodiments, the visual fingerprinting system 102 repeats for a certain number of iterations (e.g., three iterations). In some embodiments, the visual fingerprinting system 102 iterates until the contrastive loss converges.

Although FIG. 4B illustrates the negative digital image 410, the visual fingerprinting system 102 can perform a similar approach by applying digital image augmentations to the digital image 418. Indeed, the visual fingerprinting system 102 can perform the acts 412-416 to increase a contrastive loss (e.g., emphasize the distinctions between the digital image and the augmented version of the digital image).

As mentioned above, the visual fingerprinting system 102 also applies a second objective function in modifying parameters of a deep visual fingerprinting model. For example, FIG. 4C illustrates modifying parameters of a deep visual fingerprinting model to reduce a contrastive loss between a digital image and an augmented digital image in accordance with one or more embodiments.

Specifically, FIG. 4C illustrates the digital image 418 and the augmented digital image 414 (e.g., the augmented digital image selected upon iteratively performing the acts 412-416). The visual fingerprinting system 102 performs an act 420 of generating a first embedding 420a from the digital image 418 and a second embedding from the augmented digital image 414. As shown, the first embedding 420a and the second embedding 420b are mapped to the same feature space, where distance reflects similarity/difference between the digital images.

As shown, in an act 422, the visual fingerprinting system 102 utilizes the embeddings 420a, 420b to determine a contrastive loss 422a. As mentioned above, the visual fingerprinting system 102 can utilize a variety of measures of contrastive loss, including the SimCLR loss.

The visual fingerprinting system 102 can them perform an act 424 of modifying parameters of a deep visual fingerprinting model. Specifically, the visual fingerprinting system 102 modifies parameters of the deep visual fingerprinting model to reduce the contrastive loss 422a. As mentioned above, decreasing contrastive loss can result in different adjustments depending on the context. Indeed, for different versions of the same digital image (e.g., positive digital images) the visual fingerprinting system 102 can reduce the contrastive loss by bringing visual fingerprints closer together. Thus, as shown in FIG. 4C, in this positive use case, the visual fingerprinting system 102 modifies parameters of the deep visual fingerprinting model to decrease a difference between an initial digital image and an augmented digital image from the initial digital image (such that the embeddings are closer together).

However, the digital images illustrated in FIG. 4C are actually negative digital images (e.g., the digital image 418 and the augmented digital image 414 do not have the same source). Accordingly, in this negative use case, the visual fingerprinting system 102 decreases the contrastive loss 422a by increasing the difference between augmented digital image 414 and the digital image 418 within a feature space.

For example, consider an embodiment where f(x) refers to a retrieval model, x refers to an original (or initial) image, $\theta$ refers to the model parameters, and $\phi: \mathbb{R}^d \rightarrow \mathbb{R}^D$ denotes the mapping of an image to its D-dimensional feature vector by the image retrieval model (and hashing is performed using the sign function as discussed above). Similarly, $L(\{x_i\}_{i=1}^{2N})$ refers to a contrastive loss (e.g., SimCLR) defined on a batch of paired examples, where i-th and (N+i)-th examples correspond to the same images but with different random augmentations, i.e.:

$$L(\{x_i\}_{i=1}^{2N}) = \frac{1}{2N}\sum_{i=1}^{N}\left[\ell(\{x_i\}_{i=1}^{2N})_{i,N=i} + \ell(\{x_i\}_{i=1}^{2N})_{N+i,i}\right]$$

$$\text{where } \ell(\{x_i\}_{i=1}^{2N})_{i,j} = -\log\frac{\exp(sim(\phi(x_i), \phi(x_j))/\tau)}{\sum_{k=1}^{2N}\mathbb{1}_{k \neq 1}\exp(sim(\phi(x_i), \phi(x_j))/\tau)}$$

Then to train adversarially robust image retrieval models, the visual fingerprinting system 102 utilizes the following robust optimization framework:

$$\min_{\theta \in \mathbb{R}^{|\theta|}} \mathbb{E}_{\{x_i\}_{i=1}^{2N} \sim D}\left[\max_{\substack{\|\delta_i\| \leq \varepsilon \\ 0 \leq x_i + \delta_i \leq 1}} L(\{x_i + \delta_i\}_{i=1}^{2N})\right]$$

In the foregoing equation, the maximization objective (e.g., first objective function 402) selects an augmentation $\partial_i$ that maximizes the contrastive loss subject to the constraints $\|\delta_i\| \leq \varepsilon$ (the augmentation falls within a particular radius) and $0 \leq x_i + \delta_i \leq 1$. Similarly, the minimization objective (e.g., the second objective function 404) modifies parameters $\theta$ to minimize the contrastive loss. Accordingly, the visual fingerprinting system 102 perturbs images such that augmentations of the same image become farther and augmentations of different images closer to each other (i.e., such that the network becomes resilient to these small worst-case changes).

The visual fingerprinting system 102 can utilize adversarial training with a few iterations of projected gradient ascent (for example, up to 3) for the inner maximization problem, where each iteration requires an evaluation of the input gradient $\nabla_{\delta_i} L(\{x_i + \delta_i\}_{i=1}^{2N})$ via backpropagation. Using a few iterations of the attack comes out to be sufficient to prevent the catastrophic over fitting problem which also manifests itself in training image retrieval models.

Theoretically, the complexity grows linearly with the number of iterations for solving the inner maximization problem but in practice with a large set of expensive augmentations GPUs can be underutilized, especially, for multi-GPU training. Thus, in experiments performed by researchers with adversarial training that uses 3 iterations of the attack, the computational overhead comes out to be not 4× but rather 2.3×. This is significant as training large-scale models on millions images is already expensive and having a larger magnitude overhead would make the training too computationally demanding.

As mentioned above, in one or more embodiments, the visual fingerprinting system 102 also implements a hashing term with the contrastive loss for generative accurate binary hashes. For example, the visual fingerprinting system 102 can generate a feature vector (e.g., the embedding discussed above). In particular, the visual fingerprinting system 102 can map the digital image to a feature vector utilizing the image retrieval model. The visual fingerprinting system 102 can utilize a hashing model (e.g., sign hashing function) to generate a visual hash from the feature vector. The visual fingerprinting system 102 can then compare the visual hash and the feature vector to generate the hashing term. In such an embodiment, the final training objective is based on the contrastive loss combined with the hashing term so that the model generates binary hashes for a large-scale search at inference time:

$$\min_{\theta \in \mathbb{R}^{|\theta|}} \mathbb{E}_{\{x_i\}_{i=1}^{2N} \sim D} \left[ \max_{\substack{\|\delta_i\| \leq \varepsilon \\ 0 \leq x_i + \delta_i \leq 1}} L\left(\{x_i + \delta_i\}_{i=1}^{2N}\right) \right] + \alpha \mathbb{E}_{x_i \sim D} \left[ \|\phi(x) - \text{sign}\phi(x)\|^3 \right]$$

Accordingly, the visual fingerprinting system 102 modifies parameters of the deep visual fingerprinting model based on the hashing term and the contrastive loss (e.g., via backpropagation).

In one or more embodiments, the visual fingerprinting system 102 approximates the expectations using mini-batches and applies the hashing term on the same examples as the main contrastive loss. Similarly, in some embodiments, the visual fingerprinting system 102 does not use projection layers on top of the target embeddings as they may harm the image retrieval performance.

In addition, a number of embodiments utilize a variety of implementation differences relative to other self-supervised learning approaches, including the presence of the hashing term, set of augmentations used (e.g., avoiding large random cropping so that the content of an image is preserved), hyperparameters (e.g., no projection layers, shorter training), and final metric for model selection (image retrieval performance vs transfer learning).

Although FIGS. 4A-4C discuss utilizing a robust contrastive loss approach in training a deep visual fingerprinting model, the visual fingerprinting system 102 can also utilize this approach in training (and then utilizing) other models. For example, in some embodiments, the visual fingerprinting system 102 utilizes the first objective function 402 and the second objective function 404 to a deep learning model that predicts an area of manipulation in an image. For instance, the visual fingerprinting system 102 can utilize this approach in training the image comparator model 316 (e.g., the model described in Deep image comparator discussed above). Accordingly, the defense described herein is a flexible approach that can be utilized in a variety of deep learning models.

As mentioned above, the researchers have conducted a variety of experiments that establish improvements of example implementations of the visual fingerprinting system 102 relative to conventional systems. In particular, researchers developed and implemented a number of adversarial attacking approaches to test the accuracy and interpretability of example embodiments of the visual fingerprinting system 102. For instance, researchers performed untargeted attacks, targeted attacks, and hash inversion attacks. Specifically, researchers performed untargeted attacks by generating adversarial examples from an original digital image where the adversarial examples added augmentations to increase the L2 distance differentiable approximation of the adversarial hash relative to the original image hash. Researchers performed targeted attacks by identifying a target digital image different from a benign digital image and augmenting the benign digital image to minimize the L2 distance between a differentiable approximation of the adversarial hash relative to the original hash (subject to an L-infinity constraint on the augmentations). Researchers performed hash inversion attacks similar to the targeted attack but without the L-infinity norm constraint and without a benign starting image (e.g., starting from noise or random input in generating an adversarial hash).

Figure 5A:
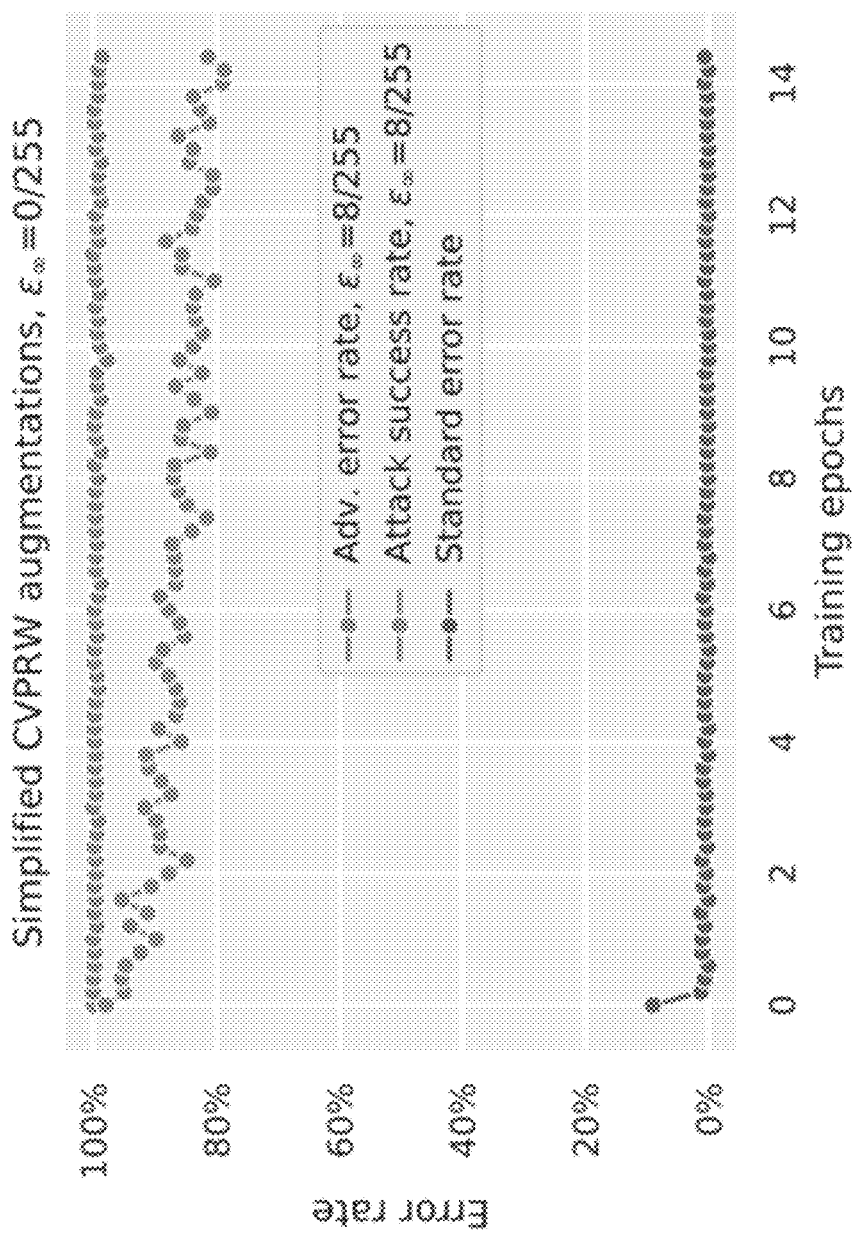
FIGS. 5A-5B illustrate example graphs of experimental results in accordance with one or more embodiments.

FIG. 5A illustrates a learning curve for a conventional model trained utilizing contrastive learning, but without the robust contrastive learning approach described above (e.g., with the second objective function 404 but without the first objective function 402). As shown, the adversarial error rate and the attack success rate are quite high. Indeed, the adversarial error rate (probability of retrieving a wrong image under benign transformations and an adversarial perturbation) is well above 90% and the attack success rate (probability of retrieving a random target image under benign transformations and an adversarial perturbation) is over 80%, while the standard error rate (the probability of retrieving a wrong image under benign transformations) is low. This illustrates that conventional models, even if trained to accurately identify images with benign transformations, are subject to significant accuracy problems when subject to adversarial attacks.

Figure 5B:
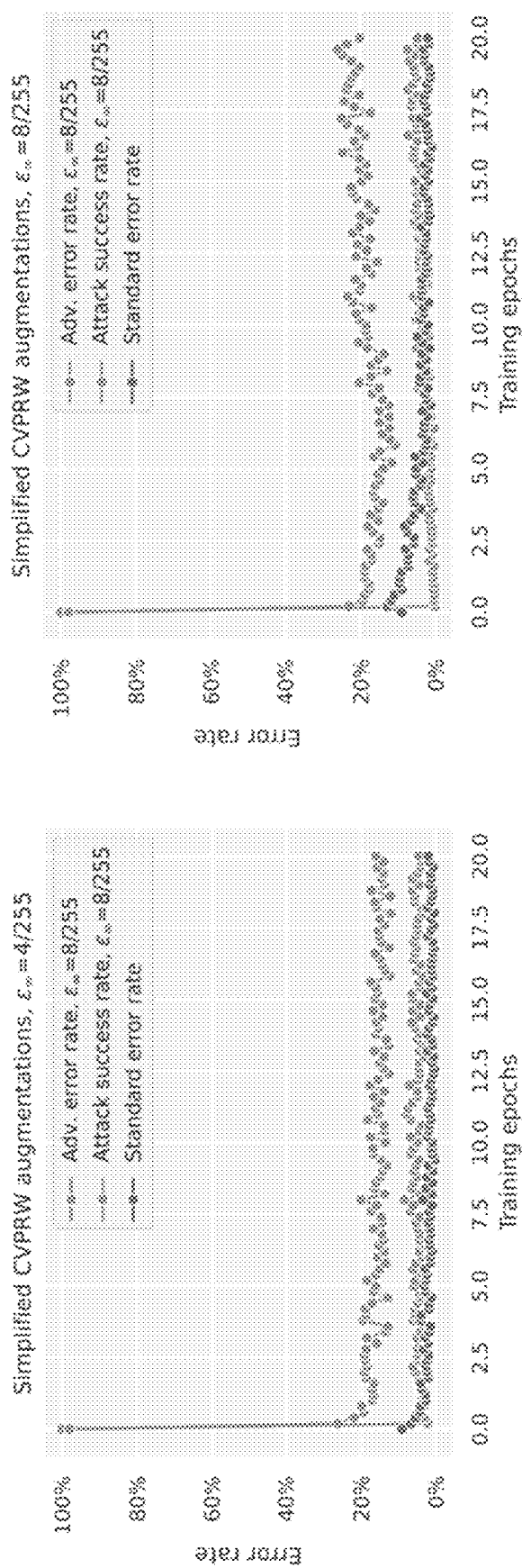

In contrast, FIG. 5B illustrates a learning curve for two example implementations of the visual fingerprinting system 102 (e.g., one implementation where ε=4/255 and another implementation where ε=8/255). As shown, these two embodiments reflect significant improvements relative to the conventional model shown in FIG. 5A. Both models illustrate an adversarial error rate around or below 20% and an attack success rate below 10% (while maintaining a low standard error rate). Thus, the visual fingerprinting system 102 can significantly improve the accuracy of visual fingerprinting models subject to adversarial attacks.

Table 1 further illustrates the flexibility of example implementations of the visual fingerprinting system 102 relative to an undefended fingerprinting model. Table 1 illustrates that the example embodiments of the visual fingerprinting system 102 are significantly more accurate and generalize to other types of imperceptible perturbations which were unseen during training such as L2-bounded perturbations ($\varepsilon_2$=0.5). Moreover, there is also a considerable improvement for larger L-infinity perturbations than those used for training $$\left( \varepsilon_\infty \in \left\{ \frac{12}{255}, \frac{16}{255}, \frac{32}{255} \right\} \right).$$

TABLE 1

| Model | Error Rate | Attack success rate | | | |
|---|---|---|---|---|---|
| | | $\varepsilon_2 = 0.5$ | $\varepsilon_\infty = {}^{12}/_{255}$ | $\varepsilon_\infty = {}^{16}/_{255}$ | $\varepsilon_\infty = {}^{32}/_{255}$ |
| Undefended | 6.6% | 85.6˜ | 99.6% | 99.8% | 99.8% |
| Robustly trained, $\varepsilon_\infty = {}^{2}/_{255}$ | 0.4% | 5.6% | 19.6% | 31.6% | 80.8% |
| Robustly trained, $\varepsilon_\infty = {}^{8}/_{255}$ | 5.2% | 0.8% | 6.4% | 12.0% | 43.6% |

In addition, FIG. 6 illustrates an additional improvement relative to conventional systems. In particular, FIG. 6 shows a digital image 602, an inverse hash 604 resulting from an attack on a conventional system and an inverse hash 606 resulting from an attack on an example embodiment of the visual fingerprinting system 102. FIG. 6 illustrates that adversarially robust image hashing models generated in accordance with example embodiments of the visual fingerprinting system 102 output plausible images under hash inversion attacks. In particular, example implementations of the visual fingerprinting system 102 focuses more on shapes of objects which are approximately recovered under a hash inversion attack. This behavior has not been studied in the image retrieval setting, particularly for hashing models. At the same time, hash inversion attacks on standardly trained hashing models tend to produce high-frequency patterns which cannot be interpreted by humans. This appears to be related to the adversarial vulnerability problem: the attacker can "cheat" by using non-robust features to arbitrarily manipulate the model's decision. However, upon training via robust contrastive learning, hash inversions start to make visual sense which also indicates that the model relies on more robust features like object shapes.

Figure 7:
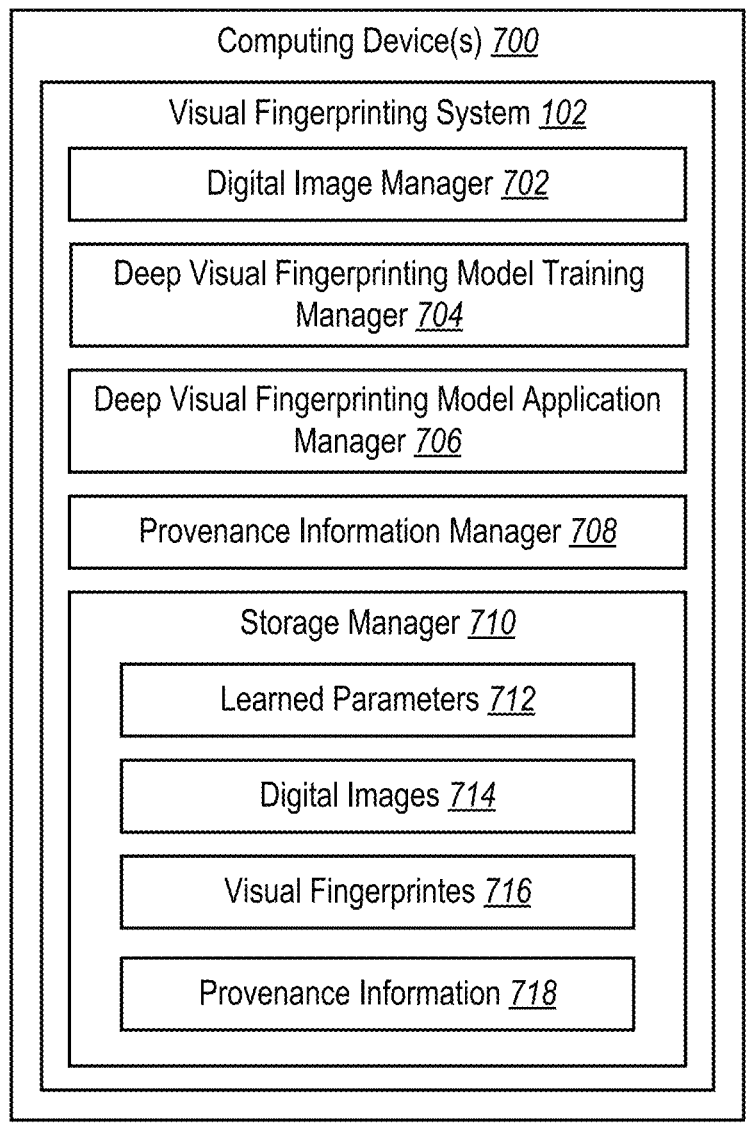
FIG. 7 illustrates a schematic diagram of an interactive image editing system in accordance with one or more embodiments.

Looking now to FIG. 7, additional detail will be provided regarding components and capabilities of the visual fingerprinting system 102. Specifically, FIG. 7 illustrates an example schematic diagram of the visual fingerprinting system 102 on an example computing device 700 (e.g., one or more of the client device 112 and/or the server(s) 104). As shown in FIG. 7, the visual fingerprinting system 102 includes a digital image manager 702, a deep visual fingerprinting model training manager 704, a deep visual fingerprinting model application manager 706, a provenance information manager 708, and a storage manager 710.

As just mentioned, the visual fingerprinting system 102 includes the digital image manager 702. The digital image manager 702 can collect, identify, retrieve, and/or modify digital images. For example, the digital image manager 702 can collect digital images and monitor interactions, modifications and/or revisions corresponding to a digital image.

As shown in FIG. 7, the visual fingerprinting system 102 also includes the deep visual fingerprinting model training manager 704. The deep visual fingerprinting model training manager 704 can train, learn, and/or generate parameters of a deep visual fingerprinting model. As discussed above, the deep visual fingerprinting model training manager 704 can train an image retrieval model and a hashing model. For example, the deep visual fingerprinting model training manager 704 can utilize robust contrastive learning with two opposing objective functions to select digital image augmentations and modify parameters of the deep visual fingerprinting model.

As further illustrated in FIG. 7, the visual fingerprinting system 102 also includes the deep visual fingerprinting model application manager 706. The deep visual fingerprinting model application manager 706 can apply, implement, and/or utilize a deep visual fingerprinting model. For example, as described above, the deep visual fingerprinting model application manager 706 can generate a visual fingerprint of a digital image. Moreover, the deep visual fingerprinting model application manager 706 can compare visual fingerprints to conduct a search for a matching digital image. Indeed, the deep visual fingerprinting model application manager 706 can compare visual fingerprints (e.g., visual hashes) to identify and provide matching digital images to a client device (e.g., in response to a matching digital image query or other user interaction).

Moreover, as shown, the visual fingerprinting system 102 can include the provenance information manager 708. The provenance information manager 708 can identify, collect, generate, monitor, revise, and/or provide provenance information corresponding to a digital image. For example, as described above, upon identifying a matching digital image for an original digital image, the provenance information manager 708 can provide provenance information to a client device corresponding to the matching digital image.

In addition, as illustrated in FIG. 7, the visual fingerprinting system 102 can also include the storage manager 710. The storage manager 710 can include one or more memory devices for storing information related to the visual fingerprinting system 102. For instance, as shown, the storage manager 710 can store, recall, and/or maintain learned parameters 712 (e.g., learned parameters of a deep visual fingerprinting model), digital images 714 (e.g., sourced digital images), visual fingerprints 716 (e.g., visual fingerprints corresponding to the digital images 714), and/or provenance information 718 (e.g., provenance information corresponding to the digital images 714).

In one or more embodiments, each of the components of the visual fingerprinting system 102 are in communication with one another using any suitable communication technologies. Additionally, the components of the visual fingerprinting system 102 are in communication with one or more other devices including one or more client devices described above. It will be recognized that although the components of the visual fingerprinting system 102 are shown to be separate in FIG. 7, any of the subcomponents may be combined into fewer components, such as into a single component, or divided into more components as may serve a particular implementation. Furthermore, although the components of FIG. 7 are described in connection with the visual fingerprinting system 102, at least some of the components for performing operations in conjunction with the visual fingerprinting system 102 described herein may be implemented on other devices within the environment.

The components of the visual fingerprinting system 102 can include software, hardware, or both. For example, the components of the visual fingerprinting system 102 can include one or more instructions stored on a computer-readable storage medium and executable by processors (or at least one processor) of one or more computing devices (e.g., the computing device 700). When executed by the one or more processors, the computer-executable instructions of the visual fingerprinting system 102 can cause the computing device 700 to perform the methods described herein. Alternatively, the components of the visual fingerprinting system 102 can comprise hardware, such as a special purpose processing device to perform a certain function or group of functions. Additionally, or alternatively, the components of the visual fingerprinting system 102 can include a combination of computer-executable instructions and hardware.

Furthermore, the components of the visual fingerprinting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the visual fingerprinting system 102 may be implemented as part of a stand-alone application on a personal computing device or a mobile device. Alternatively, or additionally, the components of the visual fingerprinting system 102 may be implemented in any application for displaying, modifying, or identifying digital content, including, but not limited to ADOBE CREATIVE CLOUD, LIGHTROOM, BEHANCE, PHOTOSHOP, and ADOBE STOCK. The foregoing are either registered trademarks or trademarks of Adobe Inc. in the United States and/or other countries.

Figure 8:
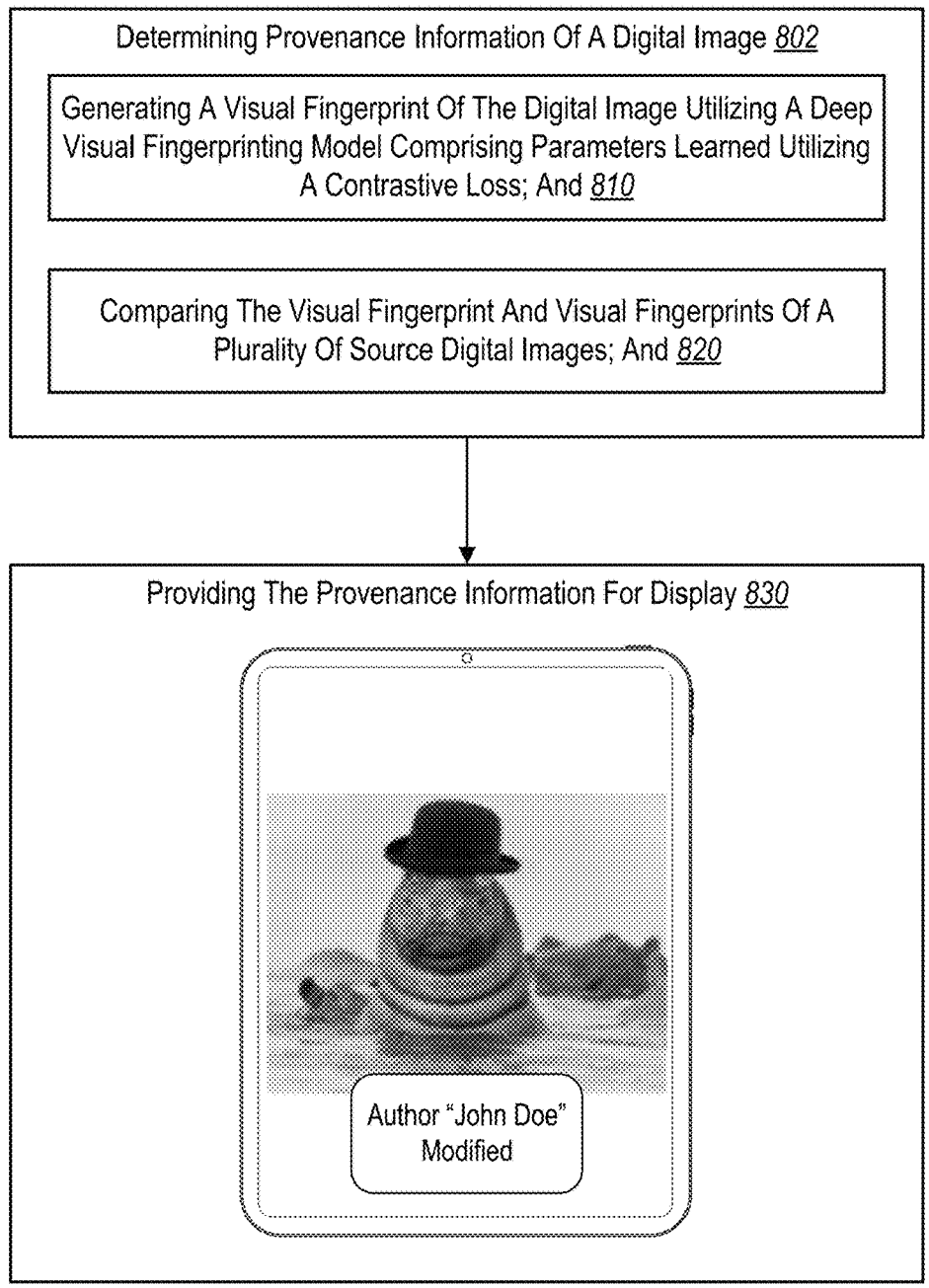
FIG. 8 illustrates a flowchart of a series of acts for utilizing a deep visual fingerprinting model to generate visual fingerprints in accordance with one or more embodiments.

FIGS. 1-7 the corresponding text, and the examples provide a number of different systems, methods, and non-transitory computer readable media for generating and/or utilizing a deep visual fingerprinting model based on robust contrastive learning. In addition to the foregoing, embodiments can also be described in terms of flowcharts comprising acts for accomplishing a particular result. For example, FIG. 8 illustrates a flowchart of an example sequence or series of acts for utilizing a deep visual fingerprinting model to generate visual fingerprints in accordance with one or more embodiments. Similarly, FIG. 9 illustrates a flowchart of an example sequence or series of acts for learning parameters of a deep visual fingerprinting model in accordance with one or more embodiments.

While FIGS. 8-9 illustrates acts according to particular embodiments, alternative embodiments may omit, add to, reorder, and/or modify any of the acts shown in FIGS. 8-9. The acts of FIGS. 8-9 can be performed as part of a method. Alternatively, a non-transitory computer readable medium can comprise instructions, that when executed by one or more processors, cause a computing device to perform the acts of FIGS. 8-9. In still further embodiments, a system can perform the acts of FIG. 8-9. Additionally, the acts described herein may be repeated or performed in parallel with one another or in parallel with different instances of the same or other similar acts.

FIG. 8 illustrates an example series of acts 800 for utilizing a deep visual fingerprinting model to generate visual fingerprints in accordance with one or more embodiments. In particular, the series of acts 800 includes an act 802 of determining provenance information of a digital image. Specifically, the act 802 can include determining provenance information of a digital image selected by a client device.

As shown the act 802 can include an act 810 of generating a visual fingerprint of the digital image utilizing a deep visual fingerprinting model comprising parameters learned utilizing a contrastive loss. In particular, the act 810 can include generating a visual fingerprint of the digital image utilizing a deep visual fingerprinting model comprising parameters learned utilizing a contrastive loss between digital images and augmented digital images selected to increase the contrastive loss. For instance, in some embodiments, the parameters of the deep visual fingerprinting model are/were learned utilizing the contrastive loss by utilizing a first objective function that increases the contrastive loss to select the augmented digital images and a second objective function that reduces the contrastive loss to modify the parameters. Thus, a deep visual fingerprinting model can comprise parameters learned utilizing a first objective function to select image augmentations that increase a contrastive loss and a second objective function to select the parameters that reduce the contrastive loss. Moreover, the act 810 can include generating a visual fingerprint from a digital image received from a client device utilizing the parameters of the deep visual fingerprinting model. In some implementations, the act 810 includes by utilizing a convolutional neural network to generate the visual fingerprint.

As illustrated, the act 802 can also include an act 820 of comparing the visual fingerprint and visual fingerprints of a plurality of source digital images. In particular the act 820 can include comparing the visual fingerprint and visual fingerprints of a plurality of source digital images to determine the provenance information. For example, the act 820 can also include identifying a matching digital image for the digital image from the plurality of source digital images by comparing the visual fingerprint and the visual fingerprints of the plurality of source digital images; and determining the provenance information from source data corresponding to the matching digital image.

Moreover, as shown in FIG. 8, the series of acts 800 can include the act 830 of providing the provenance information for display. For example, the act 830 can include providing the provenance information for display with the digital image via a user interface of the client device. Moreover, the act 830 can include providing, for display, at least one of: a digital image creator or a digital image owner.

In some embodiments, the act 830 can also include comparing the matching digital image and the digital image using an image comparator model to determine a manipulation prediction. Moreover, the act 830 can include providing the manipulation prediction for display with the provenance information.

In some embodiments, the series of acts 800 may or may not include determining or providing provenance information. For example, the series of acts can be utilized to search for a matching digital image. Thus, the series of acts 800 can include search for a matching digital image of the digital image from the plurality of digital images by comparing the visual fingerprint and the visual fingerprints corresponding to the plurality of digital images.

Furthermore, the series of acts 800 can also include learning the parameters of the deep visual fingerprinting model by: generating an augmented digital image from an initial digital image by selecting a first digital image augmentation; determining a contrastive loss between the augmented digital image and the initial digital image; and selecting a second digital image augmentation utilizing the first objective function based on the contrastive loss. The series of acts 800 can also include learning the parameters of the deep visual fingerprinting model by modifying the parameters of the deep visual fingerprinting model utilizing the second objective function to decrease the contrastive loss.

FIG. 9 illustrates an examples series of acts 900 for learning parameters of a deep visual fingerprinting model. As shown, the series of acts 900 includes an act 910 of determining a contrastive loss between a digital image and a first augmented digital image. In particular, the act 910 can include determining a contrastive loss between a digital image and a first augmented digital image corresponding to a first digital image augmentation.

The series of acts 900 can also include an act 920 of generating a second augmented digital image by selecting a second digital image augmentation according to a first objective function. For instance, the act 920 can include generating a second augmented digital image by selecting a second digital image augmentation according to a first objective function that increases the contrastive loss. For example, the act 920 can include determining a gradient of the contrastive loss via backpropagation; and selecting the second digital image augmentation according to the first objective function utilizing the gradient. In some implementations, the act 920 includes generating the first augmented digital image from the digital image by applying the first digital image augmentation to the digital image; and utilizing the first objective function to increase the contrastive loss by selecting the second digital image augmentation to increase a difference between the first augmented digital image and the digital image.

The series of acts 900 can also include an act 930 of modifying parameters of a deep visual fingerprinting model according to a second objective function. In particular, the act 930 can include modifying parameters of a deep visual fingerprinting model according to a second objective function that decreases the contrastive loss. In some embodiments, the act 930 includes mapping the digital image to a feature vector by an image retrieval model; generating a visual hash of the digital image from the feature vector; determining a hashing term by comparing the feature vector and the visual hash; and modifying the parameters of the deep visual fingerprinting model based on the hashing term and the contrastive loss.

The series of acts 900 can also include selecting the first digital image augmentation and the second digital image augmentation according to an imperceptible perturbation radius. In addition, the series of acts 900 can include generating the first augmented digital image from the digital image by applying the first digital image augmentation to the digital image; and utilizing the first objective function to increase the contrastive loss by selecting the second digital image augmentation to increase a difference between the first augmented digital image and the digital image.

Moreover, the series of acts 900 can include generating the first augmented digital image from a negative sample digital image by applying the first digital image augmentation to the negative sample digital image. The series of acts 900 can also include utilizing the first objective function to increase the contrastive loss by selecting the second digital image augmentation to decrease a difference between the first augmented digital image and the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
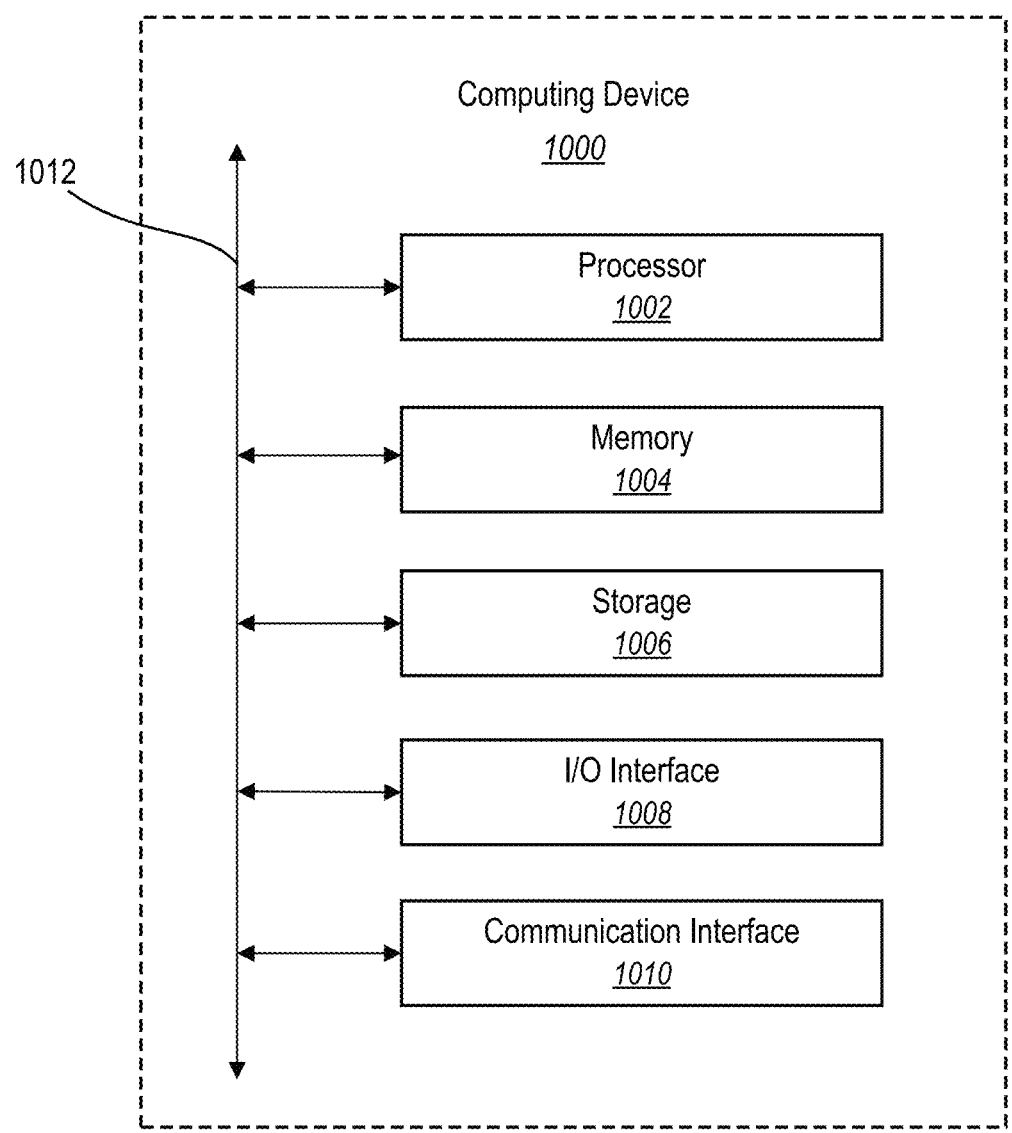
FIG. 10 illustrates a block diagram of an example computing device in accordance with one or more embodiments.

FIG. 10 illustrates, in block diagram form, an example computing device 1000 (e.g., the computing device 700, the client device 112, and/or the server(s) 104) that may be configured to perform one or more of the processes described above. One will appreciate that the visual fingerprinting system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
    determine provenance information of a digital image selected by a client device by:
        generating a visual fingerprint of the digital image utilizing a deep visual fingerprinting model comprising parameters learned utilizing a contrastive loss between digital images and augmented digital images selected to increase the contrastive loss; and
        comparing the visual fingerprint and visual fingerprints of a plurality of source digital images to determine the provenance information; and
    provide the provenance information for display with the digital image via a user interface of the client device.

2. The non-transitory computer readable medium of claim 1, further comprising instructions that, when executed by the at least one processor, cause the computing device to determine the provenance information by:
    identifying a matching digital image for the digital image from the plurality of source digital images by comparing the visual fingerprint and the visual fingerprints of the plurality of source digital images; and determining the provenance information from source data corresponding to the matching digital image.

3. The non-transitory computer readable medium of claim 2, further comprising instructions that, when executed by the at least one processor, cause the computing device to: compare the matching digital image and the digital image using an image comparator model to determine a manipulation prediction.

4. The non-transitory computer readable medium of claim 3, further comprising instructions that, when executed by the at least one processor, cause the computing device to provide the manipulation prediction for display with the provenance information.

5. The non-transitory computer readable medium of claim 1, further comprising instructions that, when executed by the at least one processor, cause the computing device to provide the provenance information for display with the digital image via the user interface of the client device by providing, for display, at least one of: a digital image creator or a digital image owner.

6. The non-transitory computer readable medium of claim 1, wherein the parameters of the deep visual fingerprinting model were learned utilizing the contrastive loss by utilizing a first objective function that increases the contrastive loss to select the augmented digital images and a second objective function that reduces the contrastive loss to modify the parameters.

7. A system comprising:
one or more memory devices comprising:
visual fingerprints corresponding to a plurality of digital images, and
a deep visual fingerprinting model comprising parameters learned utilizing a first objective function to select image augmentations that increase a contrastive loss and a second objective function to select the parameters that reduce the contrastive loss; and
one or more processors that are configured to cause the system to:
generate a visual fingerprint from a digital image received from a client device utilizing the parameters of the deep visual fingerprinting model; and
search for a matching digital image of the digital image from the plurality of digital images by comparing the visual fingerprint and the visual fingerprints corresponding to the plurality of digital images.

8. The system of claim 7, wherein the one or more processors are further configured to cause the system to generate the visual fingerprints from the plurality of digital images utilizing the parameters of the deep visual fingerprinting model learned utilizing the first objective function and the second objective function.

9. The system of claim 7, wherein the one or more processors are further configured to cause the system to generate the visual fingerprint from the digital image utilizing the parameters of the deep visual fingerprinting model by utilizing a convolutional neural network to generate the visual fingerprint.

10. The system of claim 7, wherein the one or more processors are further configured to cause the system to:
determine the matching digital image by comparing the visual fingerprint and the visual fingerprints corresponding to the plurality of digital images; and
identify provenance information for the digital image from the matching digital image.

11. The system of claim 10, wherein the one or more processors are further configured to cause the system to provide the provenance information for display with the digital image via a user interface of the client device.

12. The system of claim 7, wherein the one or more processors are further configured to cause the system to learn the parameters of the deep visual fingerprinting model by:
generating an augmented digital image from an initial digital image by selecting a first digital image augmentation;
determining a contrastive loss between the augmented digital image and the initial digital image; and
selecting a second digital image augmentation utilizing the first objective function based on the contrastive loss.

13. The system of claim 12, wherein the one or more processors are further configured to cause the system to learn the parameters of the deep visual fingerprinting model by modifying the parameters of the deep visual fingerprinting model utilizing the second objective function to decrease the contrastive loss.

14. A computer-implemented method comprising:
determining a contrastive loss between a digital image and a first augmented digital image corresponding to a first digital image augmentation;
generating a second augmented digital image by selecting a second digital image augmentation according to a first objective function that increases the contrastive loss; and
modifying parameters of a deep visual fingerprinting model according to a second objective function that decreases the contrastive loss.

15. The computer-implemented method of claim 14, further comprising selecting the first digital image augmentation and the second digital image augmentation according to an imperceptible perturbation radius.

16. The computer-implemented method of claim 14, wherein generating the second augmented digital image comprises:
determining a gradient of the contrastive loss via backpropagation; and
selecting the second digital image augmentation according to the first objective function utilizing the gradient.

17. The computer-implemented method of claim 16, wherein modifying parameters of the deep visual fingerprinting model according to the second objective function comprises:
mapping the digital image to a feature vector by an image retrieval model;
generating a visual hash of the digital image from the feature vector;
determining a hashing term by comparing the feature vector and the visual hash; and
modifying the parameters of the deep visual fingerprinting model based on the hashing term and the contrastive loss.

18. The computer-implemented method of claim 14, further comprising:
generating the first augmented digital image from the digital image by applying the first digital image augmentation to the digital image; and
utilizing the first objective function to increase the contrastive loss by selecting the second digital image augmentation to increase a difference between the first augmented digital image and the digital image.

19. The computer-implemented method of claim 14, further comprising generating the first augmented digital image from a negative sample digital image by applying the first digital image augmentation to the negative sample digital image.

20. The computer-implemented method of claim 19, further comprising utilizing the first objective function to increase the contrastive loss by selecting the second digital image augmentation to decrease a difference between the first augmented digital image and the digital image.

* * * * *